(12) United States Patent
Ramaswamy

(10) Patent No.: US 7,715,308 B2
(45) Date of Patent: May 11, 2010

(54) FAULT TOLERANCE IN A WIRELESS NETWORK

(75) Inventor: Lakshmi Ramaswamy, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 1417 days.

(21) Appl. No.: 11/008,068

(22) Filed: Dec. 9, 2004

(65) Prior Publication Data

US 2006/0126501 A1 Jun. 15, 2006

(51) Int. Cl.
*H04J 1/16* (2006.01)
(52) U.S. Cl. .................... 370/217; 370/331
(58) Field of Classification Search ......... 370/219, 370/220, 221, 229, 216, 210.2, 328, 338, 370/400, 217, 310.2, 331, 349; 709/224, 709/220, 226, 228
See application file for complete search history.

(56) References Cited

U.S. PATENT DOCUMENTS

| | | | |
|---|---|---|---|
| 5,245,608 A | 9/1993 | Deaton, Jr. et al. | |
| 6,195,760 B1 | 2/2001 | Chung et al. | |
| 6,266,781 B1 | 7/2001 | Chung et al. | |
| 6,295,447 B1 | 9/2001 | Reichelt et al. | |
| 6,366,826 B1 | 4/2002 | Mead et al. | |
| 6,411,991 B1 | 6/2002 | Helmer et al. | |
| 6,437,692 B1 | 8/2002 | Petite et al. | |
| 6,611,834 B1 | 8/2003 | Aggarwal et al. | |
| 6,628,620 B1 * | 9/2003 | Cain ..................... | 370/248 |
| 7,020,501 B1 | 3/2006 | Elliott et al. | |
| 7,069,027 B2 | 6/2006 | Miriyala | |
| 7,076,211 B2 | 7/2006 | Donner et al. | |
| 7,146,532 B2 * | 12/2006 | McCabe .................. | 714/15 |
| 7,158,492 B2 * | 1/2007 | Haverinen ............... | 370/328 |
| 7,206,836 B2 * | 4/2007 | Dinker et al. ........... | 709/224 |
| 2002/0088926 A1 | 7/2002 | Prasser | |
| 2002/0133597 A1 * | 9/2002 | Jhingan et al. .......... | 709/228 |
| 2003/0129944 A1 | 7/2003 | Chang et al. | |
| 2003/0135533 A1 | 7/2003 | Cook | |
| 2003/0161327 A1 | 8/2003 | Vlodavsky et al. | |
| 2003/0174731 A1 | 9/2003 | Tafazolli et al. | |
| 2003/0177275 A1 | 9/2003 | Lind et al. | |
| 2003/0178273 A1 | 9/2003 | Bullmann et al. | |
| 2003/0233485 A1 | 12/2003 | Khan | |
| 2004/0142682 A1 | 7/2004 | Kamiya et al. | |
| 2004/0199613 A1 | 10/2004 | Hundscheidt et al. | |
| 2004/0266480 A1 | 12/2004 | Hjelt et al. | |

(Continued)

OTHER PUBLICATIONS

Bass, "Publish-Subscribe Enabled Multisensor Data Fusion", The Federation of Critical Infrastructure Information, Jul. 10, 2002, pp. 1-29, Publisher: www.silkroad.com.

(Continued)

*Primary Examiner*—Brenda Pham
(74) *Attorney, Agent, or Firm*—Fogg & Powers LLC

(57) ABSTRACT

A wireless network comprises a plurality of nodes that communicate over wireless communication links. A virtual site is established at a primary node included in the plurality of nodes. A backup node is selected for the virtual site from the plurality of nodes. When the primary node is able to do so, the primary node performs predetermined processing for the virtual site and replicates at the backup node data related to the processing. When the primary node is unable to perform the processing, the backup node performs the processing for the virtual site using at least some of the data replicated at the backup node.

26 Claims, 17 Drawing Sheets

U.S. PATENT DOCUMENTS

| | | | |
|---|---|---|---|
| 2005/0021751 A1* | 1/2005 | Block et al. | 709/225 |
| 2005/0057370 A1 | 3/2005 | Warrior et al. | |
| 2006/0005132 A1 | 1/2006 | Herdeg, III | |
| 2006/0062154 A1* | 3/2006 | Choy et al. | 370/242 |
| 2006/0181406 A1 | 8/2006 | Petite et al. | |

OTHER PUBLICATIONS

Bates et al., "Using Events for the Scalable Federation of Heterogeneous Components", 8TH ACM SIGOPS European Workshop on Support for Composing Distributed Applications, Sep. 1998, pp. 1-8, Publisher: ACM.

Govindan et al., "The Sensor Network as a Database", 2002, pp. 1-8.

Heinzelman et al., "Energy-Efficient Communication Protocol for Wireless Microsensor Networks", Proceeds of the 33RD Hawaii International Conference on System Sciences, Jan. 2000, pp. 1-10, Publisher: IEEE.

Hellerstein et al., "Beyond Average: Toward Spohisticated Sensing with Queries", Workshop on Information Processing in Sensor Networks (IPSN), 2003, pp. 1-16.

Huang et al., "Publish/Subscribe in a Mobile Environment", 2ND ACM International Workshop on Data Engineering for Wireless and Mobile Access (MobiDE), 2001, pp. 1-8, Publisher: ACM.

Intanagonwiwat et al., "Directed Diffusion: A Scalable and Robust Communication Paradigm for Sensor Networks", Proceedings of the 6TH Annual ACM International Conference on Mobile Computing and Networking, Aug. 2000, pp. 56-67, Publisher: ACM.

Madden et al., "Supporting Aggregate Queries Over Ad-Hoc Wireless Sensor Networks", Proceedings of 4TH IEEE Workshop on Mobile Computing and Systems Applications, 2002, pp. 1-10, Publisher: IEEE.

Sadagopan et al., "Active Query Forwarding in Sensor Networks", Ad Hoc Networks 3, 2005, pp. 91-113, Publisher: Elsevier B.V.

Safari, "Practical Cisco Routers", http://proquest.safaribooksonline.com/0789721031, 2007, pp. 1-8, Publisher: Safari Books Online.

Vogels et al., "The Design and Architecture of the Microsoft Cluster Service—A Practical Approach to High-Availability and Scalability", Proceedings of FTCS'98, 1998, pp. 1-10, Publisher: IEEE.

Wan et al., "PSFQ: A Reliable Transport Protocol for Wireless Sensor Networks ", Proceedings of the 8TH Annual International Conference on Mobile Computing and Networking, 2002, pp. 1-11, Publisher: ACM.

Yang et al., "A Publish/Subscribe Scheme for Peer-To-Peer Database Networks", COOPIS/DOA/ODBASE 2003, LNCS 2888, 2003, Publisher: Springer-Verlag Berlin Heidelberg.

* cited by examiner

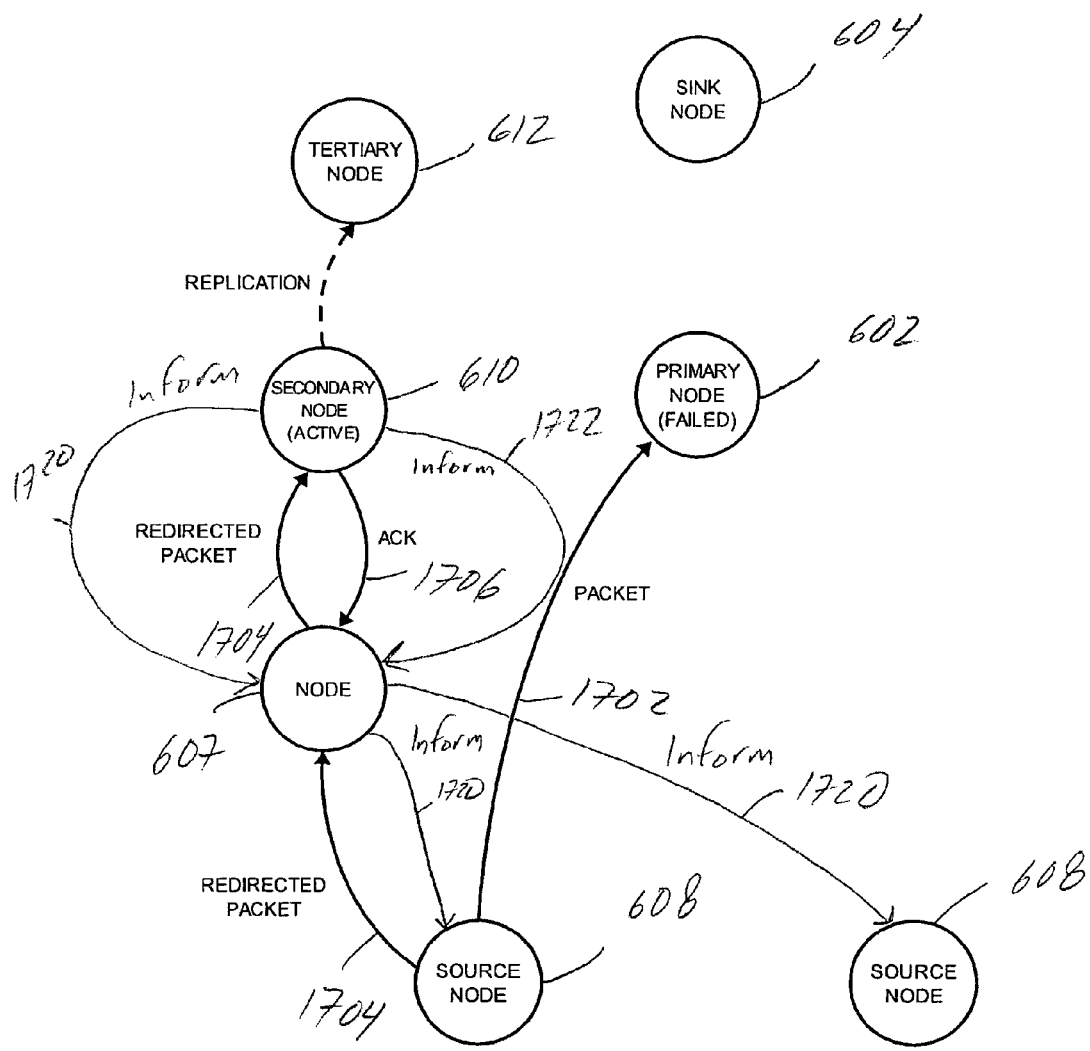

FAULT TOLERANCE IN A WIRELESS NETWORK

TECHNICAL FIELD

The following description relates to wireless networks in general and to fault tolerance in wireless networks in particular.

BACKGROUND

A wireless network typically includes several nodes that communicate with one another over wireless communication links (for example, over radio frequency communication links). One type of wireless network is a wireless sensor network in which one or more of the nodes are "sensor nodes" (also referred to here as "wireless sensor nodes"). Each sensor node incorporates (or is otherwise coupled to) a sensor. Each sensor is capable of generating a value that, at any given point in time, is indicative of some physical attribute of interest. In one configuration, the sensor nodes are battery powered and have limited computational resources (for example, limited memory and processing capability).

Data is typically retrieved from a wireless sensor network by querying the wireless sensor network for such data. Data specified in a query is retrieved from (or is otherwise generated at) one or more nodes in the wireless sensor network. The retrieved and/or generated data is returned to a recipient specified in the query.

A query can specify that various types of data are to be retrieved and/or that various types of operations are to be performed. One type of operation that can be specified in a query is an "aggregation operation" (also referred to here as "data aggregation" or "aggregation"). An aggregation operation generates a value as a function of multiple items of data. Each of the items of data is also referred to here individually as an "input item" and collectively as "input items" or "input data". The multiple items of data can comprise multiple values from a single data source and/or can comprise values from multiple data sources. Examples of data aggregation operations include an "average" operation that calculates the average of the input data, a "minimum" operation that determines the value of a minimum input item, and a "maximum" operation that determines the value of a maximum input item.

In one such configuration, a particular node in the wireless sensor network is selected to perform each aggregation operation. Such a node is also referred to here as an "aggregation node." The aggregation node receives input data from other nodes in the wireless sensor network (if necessary) and then performs the aggregation operation on the received input data. However, if the aggregation node should fail or otherwise be unable to perform the aggregation operation or communicate with other nodes in the wireless sensor network, such a query will fail.

The failure of a node can also impact other processing that is performed in a wireless network (for example, a wireless sensor network). For example, in one configuration, a wireless network is logically arranged into a set of clusters. A node in each cluster is designated as the "head" node or "cluster head" for that node. For a given cluster, the cluster head tracks which nodes are members of that cluster and routes intercluster packets. In the event that a cluster head fails or is otherwise unable to perform the cluster head processing for that cluster, the performance of the wireless network is impaired (for example, until the failure is detected and a new cluster head becomes operational).

Such failures are of especial concern in wireless sensor networks that include batter-powered nodes and/or that make use of an ad-hoc configuration.

SUMMARY

In one embodiment, a wireless network comprises a plurality of nodes that communicate over wireless communication links. A virtual site is established at a primary node included in the plurality of nodes. A backup node is selected for the virtual site from the plurality of nodes. When the primary node is able to do so, the primary node performs predetermined processing for the virtual site and replicates at the backup node data related to the processing. When the primary node is unable to perform the processing, the backup node performs the processing for the virtual site using at least some of the data replicated at the backup node.

Another embodiment is a method for use in a wireless network comprising a plurality of nodes that communicate over wireless communication links. The method comprises establishing a virtual site at a primary node included in the plurality of nodes and selecting a backup node for the virtual site from the plurality of nodes. The method further comprises, when the primary node is able to do so, at the primary node, performing predetermined processing for the virtual site; and replicating at the backup node data related to the processing. The method further comprises, when the primary node is unable to perform the processing, at the backup node, performing the processing for the virtual site using at least some of the data replicated at the backup node.

In another embodiment, a wireless node comprises a wireless transceiver to communicate over a wireless communication link. The wireless node establishes a virtual site at the wireless node, the virtual site comprising the wireless sensor node and a backup wireless sensor node. When the wireless node is in a normal state, the wireless node performs processing for the virtual site and replicates at the backup wireless node data related to processing. The backup wireless node performs the processing for the virtual site when the wireless node is in a failed state.

In another embodiment, a wireless node comprises a wireless transceiver to communicate over a wireless communication link. The wireless node acts as a backup node for a virtual site established for a primary wireless node. The virtual site comprises the primary wireless node and the wireless node. When the primary wireless node is able to do so, the primary wireless node performs processing for the virtual site and the wireless node receives replicated data related to the processing for the virtual site from the primary wireless node. The wireless node performs the processing for the virtual site when the primary wireless node is unable to do so.

In another embodiment, a wireless node comprises a wireless transceiver to communicate over a wireless communication link. A virtual site is established for a primary node. The virtual site comprises the primary node and a backup node. When the primary node is able to do so, the primary node performs processing for the virtual site. When the wireless node transmits data to the primary node, the wireless node determines if an acknowledgment for the data is received from the primary node within a predetermined amount of time, and if the acknowledgment for the data is not received from the primary node within the predetermined amount of time, the wireless node redirects the data to the backup node.

In another embodiment, a program product comprises a plurality of program instructions embodied on a processor-readable medium. The program instructions are operable to cause at least one programmable processor included in a wireless node to participate in establishing a virtual site comprising a primary node and a backup node. The program instructions are further operable to cause the at least one programmable processor to, when the wireless node is selected as the primary node for the virtual site, perform predetermined primary node processing for the virtual site when able to do so and replicate, to another node selected as the backup node for the virtual site, data used in the primary-node processing performed by the wireless node.

In another embodiment, a program product comprises a plurality of program instructions embodied on a processor-readable medium. The program instructions are operable to cause at least one programmable processor included in a wireless node to participate in establishing a virtual site comprising a primary node and a backup node. The program instructions are further operable to cause the at least one programmable processor to, when the wireless node is selected as the backup node for the virtual site, receive data replicated from another node selected as the primary node for the virtual site and perform predetermined primary node processing for the virtual site using the data replicated from the primary node when the primary node is unable to perform the primary node processing for the virtual site.

In another embodiment, software comprises program instructions embodied on a medium. A programmable processor of a wireless node reads the program instructions from the medium for execution thereby. The software comprises an availability module to participate in establishing a virtual site in wireless network of which the wireless node is a part. The virtual site comprises a primary node and a backup node. The software further comprises a data management stack to perform predetermined primary node processing for the virtual site when the wireless node is selected as the primary node for the virtual site and the wireless node is able to perform the predetermined primary node processing. When the wireless node performs the primary node processing for the virtual site, the availability module replicates, to another node selected as the backup node for the virtual site, data used in the primary-node processing performed by the wireless node.

In another embodiment, software comprising program instructions embodied on a medium. A programmable processor of a wireless node reads the program instructions from the medium for execution thereby. The software comprises an availability module to participate in establishing, in a wireless network of which the wireless node is a part, a virtual site comprising a primary node and a backup node and a data management stack. When the wireless node is selected as the backup node for the virtual site, the availability module receives data replicated from another node selected as the primary node for the virtual site and the data management stack performs predetermined primary node processing for the virtual site using the data replicated from the primary node when the primary node is unable to perform the primary node processing for the virtual site.

The details of various embodiments of the claimed invention are set forth in the accompanying drawings and the description below. Other features and advantages will become apparent from the description, the drawings, and the claims.

DRAWINGS

FIGS. 17A-17B are block diagrams illustrating one embodiment of redirection processing performed in the exemplary virtual site of FIG. 6.

Like reference numbers and designations in the various drawings indicate like elements.

DETAILED DESCRIPTION

Figure 1:
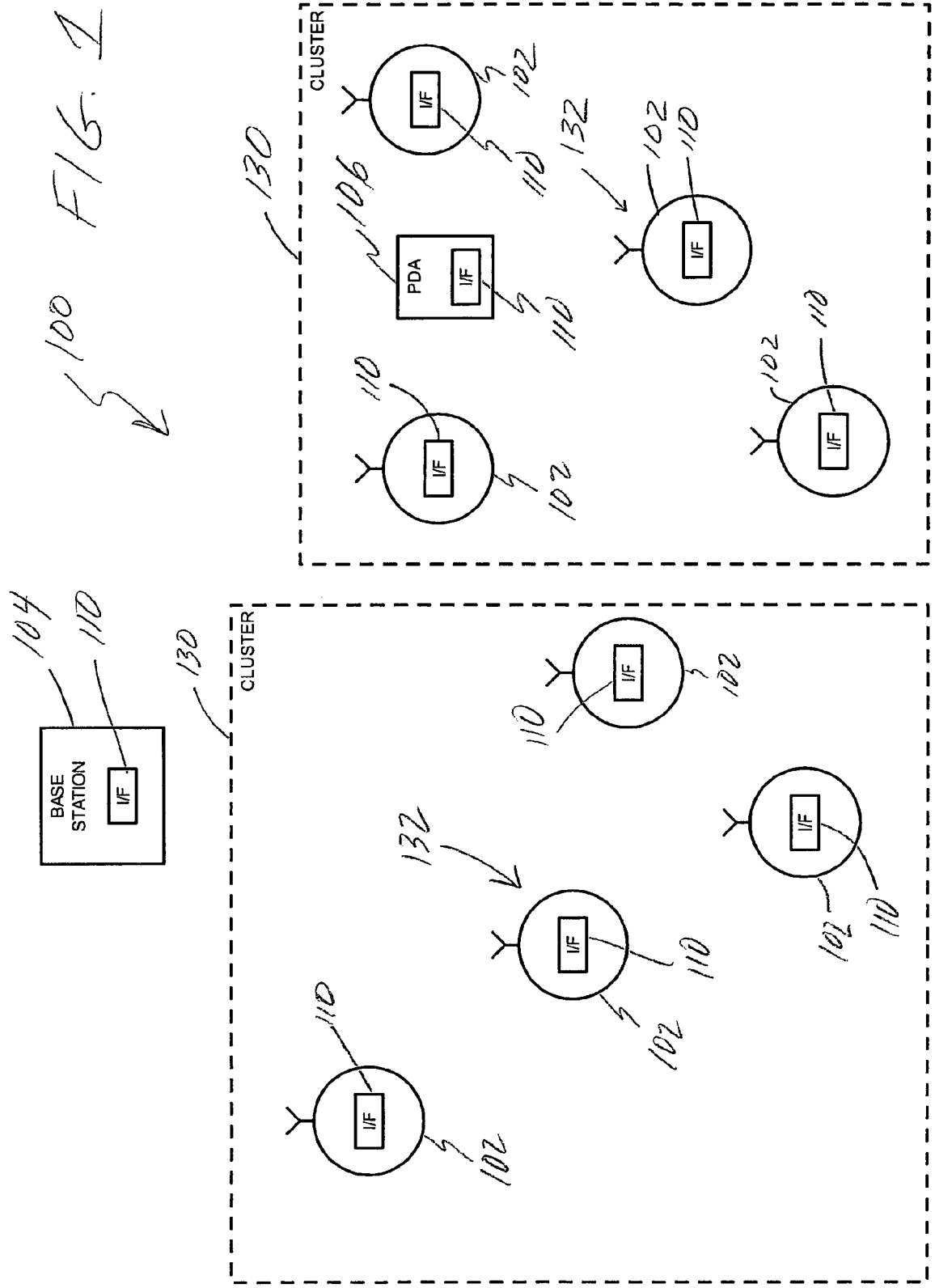
FIG. 1 is a block diagram of one exemplary embodiment of a wireless sensor network.

FIG. 1 is a block diagram of one exemplary embodiment of a wireless sensor network 100. The wireless sensor network 100 includes multiple wireless sensor nodes 102 that communicate with one another and/or a base station 104 using wireless communication links. The nodes of the wireless sensor network 100, in some embodiments, are distributed over a large geographical area. In one embodiment of the wireless sensor network 100, wireless sensor nodes 102 are distributed over an environment that is to be monitored. Each wireless sensor node 102 includes (or is otherwise coupled to) a sensor that is capable of generating a value that, at any given point in time, is indicative of some physical attribute of interest. Each wireless sensor node 102 receives sensor data from a respective sensor.

In one embodiment, the wireless sensor nodes 102 and the base station 104 communicate with one another using radio frequency (RF) communication links. In other embodiments, other wireless communication links (for example, infrared wireless communication links) are used instead of or in addition to RF wireless communication links. In one embodiment, the wireless sensor network 100 is implemented as an ad-hoc, peer-to-peer network. In such an embodiment, the nodes of the wireless sensor network 100 communicate with each other wirelessly using a multi-hop protocol. Such a multi-hop protocol provides a mechanism for a packet (or other unit of data) to be transmitted by a source node to a destination node outside of the wireless transmission range of the source node by transmitting the packet to an intermediate node within the source node's wireless transmission range. The intermediate node then forwards the packet onto the destination node (if the destination node is within the intermediate node's wireless transmission range) or onto another intermediate node within the first intermediate node's wireless transmission range. This forwarding process is repeated until the packet reaches the destination node. In another embodiment, the wireless sensor network 100 is implemented using a different wireless networking approach (for example, using an infrastructure wireless network in which wireless communications are routed through an access point or other infrastructure device).

In the particular embodiment shown in FIG. 1, a "cluster" based routing protocol is used. In such an embodiment, the wireless sensor network 100 is logically viewed as comprising a plurality of clusters 130. Each cluster 130 has a head node 132 (also referred to here as a "cluster head" 132) that tracks which nodes are members of that cluster 130. Also, when a source node in a first cluster 130 attempts to transmit a packet to a destination node in a second cluster 130, the packet transmitted by the source node is communicated (via zero, one, or more intermediate nodes) to the cluster head 132 of the first head 130. The cluster head 132 of the first cluster 130 forwards the packet onto the cluster head 132 (via zero, one or more intermediate nodes) of the second cluster 130 and the cluster head 132 of the second cluster 130 forwards the packet onto the destination node (via zero, one or more intermediate nodes).

The base station 104 provides a static point from which queries can be injected into the wireless sensor network 100 and from which data that is retrieved by such queries can be received. In one embodiment, a user communicates a query to the base station 104. The base station 104 receives the query and injects the query into the wireless sensor network 100. The query propagates to appropriate sensor nodes 102, which communicate data back to the base station 104 (via one or more intermediate nodes) as specified in the query. In one implementation, the base station 104 also acts as a gateway to another network or device not otherwise included in the wireless sensor network 100 from which queries are received and/or to which data retrieved from the wireless sensor network 100 is communicated.

The wireless sensor network 100 can also include other types of nodes. For example, as shown in FIG. 1, a personal digital assistant (PDA) 106 is included in the network 100. The PDA 106 includes a wireless transceiver that enables the PDA 106 to communicate with other nodes in the wireless sensor network 100 over one or more wireless communication links. In one usage scenario, a user uses the PDA 106 to input a query for data from the wireless sensor network 100. The PDA 106 communicates the query to the base station 104 (via one or more intermediate nodes, if necessary). The base station 104 receives the query and injects the query into the wireless sensor network 100 and communicates back to the PDA 106 any data received from the wireless sensor network 100 in response to the query.

Figure 2:
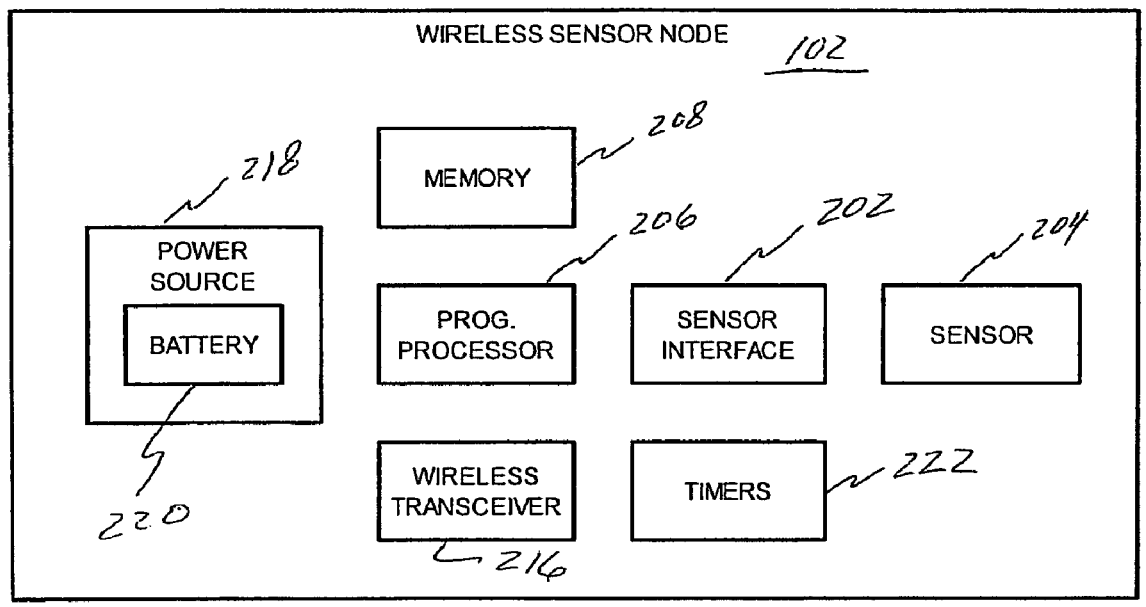
FIG. 2 is a block diagram of one embodiment of a wireless sensor node used in FIG. 1.

FIG. 2 is a block diagram of one embodiment of a wireless sensor node 102. The wireless sensor node 102 shown in FIG. 2 is suitable for use in the embodiment of a wireless sensor network 100 shown in FIG. 1. The embodiment of a wireless sensor node 102 shown in FIG. 2 comprises a sensor interface 202 that couples a sensor 204 to the wireless sensor node 102. In the particular embodiment shown in FIG. 2, the sensor 204 is integrated into the wireless sensor node 102 (for example, by enclosing the sensor 204 within a housing that encloses the sensor 204 along with the other components of the wireless sensor node 102). In another embodiment, the sensor 204 is not integrated into the wireless sensor node 102 but is otherwise communicatively coupled to the other components of the wireless sensor node 102 via the sensor interface 202.

The sensor 204 is capable of generating a value that, at any given point in time, is indicative of some physical attribute of interest. Examples of sensors 204 include devices that generate a value indicative of temperature, light, magnetic field, air flow, acceleration, vibration, sound, or power. The sensor interface 202 comprises appropriate interface hardware or software for communicatively coupling the sensor 204 to the other components of the wireless sensor node 102. For example, in one embodiment, the sensor interface 202 includes, for example, an analog-to-digital converter and/or a software driver for the sensor 204.

The wireless sensor node 102 shown in FIG. 2 further comprises a programmable processor 206. The programmable processor 206 is programmed with appropriate program instructions to perform at least a portion of the processing described here as being performed by the wireless sensor node 102. The wireless sensor node 102 shown in FIG. 2 includes memory 208 in which such program instructions and any data structures used by the program instruction are stored. The memory 208 includes any appropriate type of memory now known or later developed including without limitation, read-only memory (ROM), random access memory (RAM), and a set of registers included within the processor 206.

The wireless sensor node 102 shown in FIG. 2 also comprises a wireless transceiver 216 that transmits and receives data over one or more wireless communication links. In one embodiment, the wireless transceiver 216 comprises an RF transceiver that sends and receives data over one or more RF communication links. In other embodiments, the wireless transceiver 216 comprises other types of wireless transceivers for sending and receiving data over other types of wireless communication links (for example, an infrared transceiver for sending and receiving data over infrared communication links) instead of or in addition to an RF transceiver.

The wireless sensor node 102 also comprises a power source 218. In the embodiment shown in FIG. 2, the power source 218 includes a battery 220. In other embodiments, the power source 218 comprises, in addition to or instead of a battery 220, an interface for coupling the wireless sensor node 102 to an external power source such as a source of alternating current (AC) power. The wireless sensor node 102 also comprises one or more hardware timers 222 that are used generating interrupts based on timing-related events.

In one implementation of the embodiment shown in FIG. 2, the wireless sensor node 102 is implemented using a CHIP-CON CC1010 integrated circuit that includes an 8-bit microcontroller, 32 kilobytes of flash memory, and 2 kilobytes of RAM.

In the embodiment of the wireless sensor network 100 shown in FIG. 1, an event-based data management model is used to implement data management functionality in the wireless sensor network 100. In such an embodiment, the wireless sensor network 100 is logically viewed as a set of discrete events and a set of logical entities that "generate" the discrete events. The wireless sensor network 100 is queried, in such an embodiment, by specifying a set of events of interest. With such an event-based data management model, a discrete event operator algebra can be used as a formalism to specify the behavior of such a logical system and to verify the correctness and completeness of the specification.

Each event of interest is logically viewed as having a logical entity that is the source of that event. This source entity is also referred to here as the "producer" of that event. Also, each event of interest is logically viewed as having one or more logical entities that are sinks of that event (and/or data related to that event). Each of these sink entities is also referred to here as a "consumer" of that event or event-related data. The data management model used in such an embodiment, in other words, makes use of a "producer/consumer model." For each logical entity, there is a corresponding node in the network 100 that physically implements the processing for that logical entity. The underlying node that implements a given source entity is also referred to here as a "data source" or a "source node" and the underlying node that implements a given sink entity is also referred to here as a "data sink" or a "sink node." For example, where an event of interest is a function of sensor data provided by a particular sensor, the source entity for that event is implemented on a sensor node that is coupled to that sensor (that is, on the sensor node that is the data source for the desired sensor data). It may be the case that a particular node in the wireless sensor network 100 implements both the source entity and the sink entity for a given event.

The event-based data management model, in one such embodiment, makes use of a combined producer/consumer and publish/subscribe model. In such a model, from a logical point of view, a sink entity that wishes to receive data related to a particular event informs the wireless sensor network 100 of that entity's interest in that event. The sink entity's interest in that event is then communicated to an entity that is able to serve as a source entity for that event. The sink entity indicates that it is interested in a particular event of interest by "subscribing" to that event. A subscription is formulated and is communicated to a source entity for the event of interest. The subscription identifies the event of interest (for example, by specifying a condition for use in an event filter that identifies that event) and the sink entity to which data related to the event should be sent when the event occurs. The source entity receives the subscription and creates an event filter for that event. The source entity "publishes" the event of interest when the event occurs. That is, when the event of interest specified in the subscription occurs, the source entity sends data related to that event to the specified sink entity. In this way, the nodes in the wireless sensor network 100 only monitor (and process and communicate data about) those events that are of interest to some entity in the network 100 (that is, those events to which a sink entity has subscribed).

Commonly assigned co-pending U.S. patent application, Ser. No. 10/974,216, filed on Oct. 27, 2004, title "EVENT-BASED FORMALISM FOR DATA MANAGEMENT IN A WIRELESS SENSOR NETWORK", is hereby incorporated by reference herein (also referred to here as the "H0006262 Application"). The H0006262 Application describes such an event-based data management model.

Figure 3:
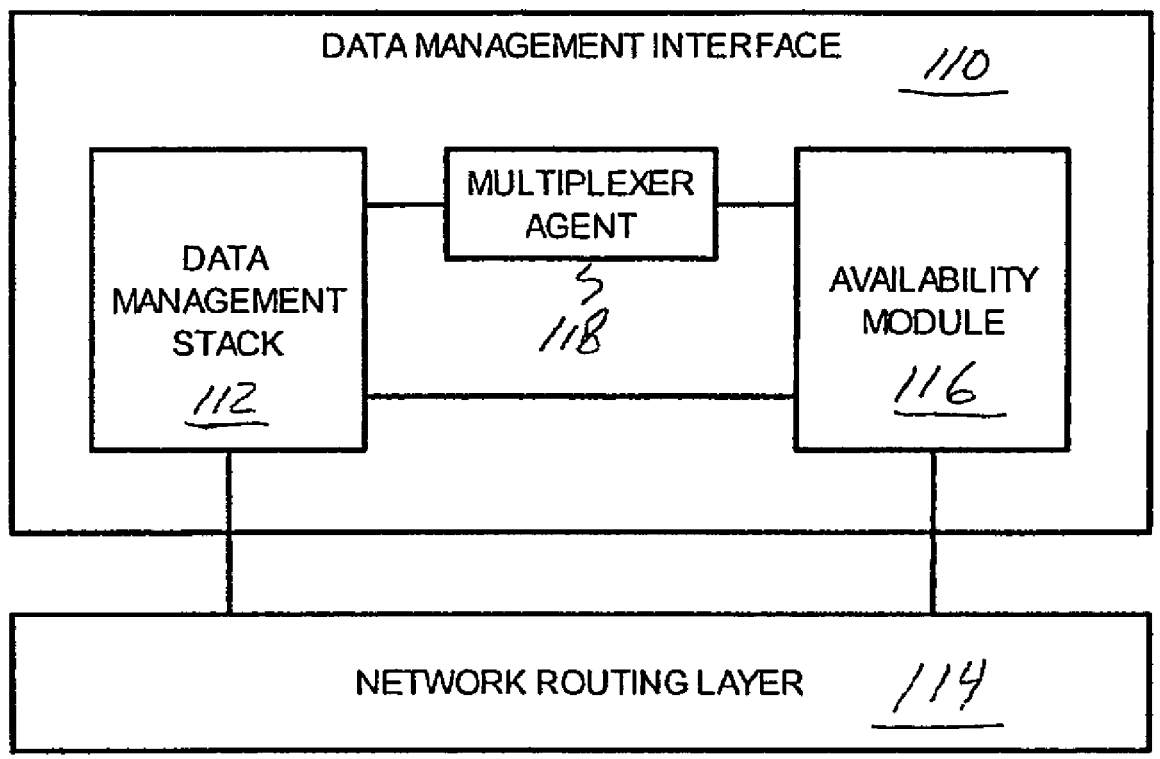
FIG. 3 is block diagram of one embodiment of a data management interface suitable for use in the wireless sensor network of FIG. 1.

As shown in FIG. 1, each of the nodes in the wireless sensor network 100 includes a data management interface 110 that implements at least a portion of the data management functionality necessary to implement such an event-based data management model. FIG. 3 is block diagram of one embodiment of a data management interface 110. In the embodiment shown in FIG. 3, the data management interface 110 of each wireless sensor node 102 comprises a data management stack 112 that implements the data management functionality that is performed at that particular node 102. In such an embodiment, the data management interface 110 further comprises an availability module 116 that performs the data availability processing as described below. The data management interface 110 also comprises a multiplexer agent 118 that communicates data from the data management stack 112 to the availability modules 116 (as described below). Each of the wireless sensor nodes 102 in the wireless sensor network 100 also includes a network and routing layer (NRL) 114 that implements the underlying networking and routing protocols used for transmitting, receiving, and routing data among the nodes of the wireless sensor network 100 over the wireless communication links. The other nodes in the wireless sensor network 100 (for example, the base station 104 and the PDA 106) also implement such networking and routing protocols. The data management interface 110 and the network routing layer 114, in one implementation, comprises software that executes on the programmable processor 206 included in each wireless sensor node 102.

Figure 4:
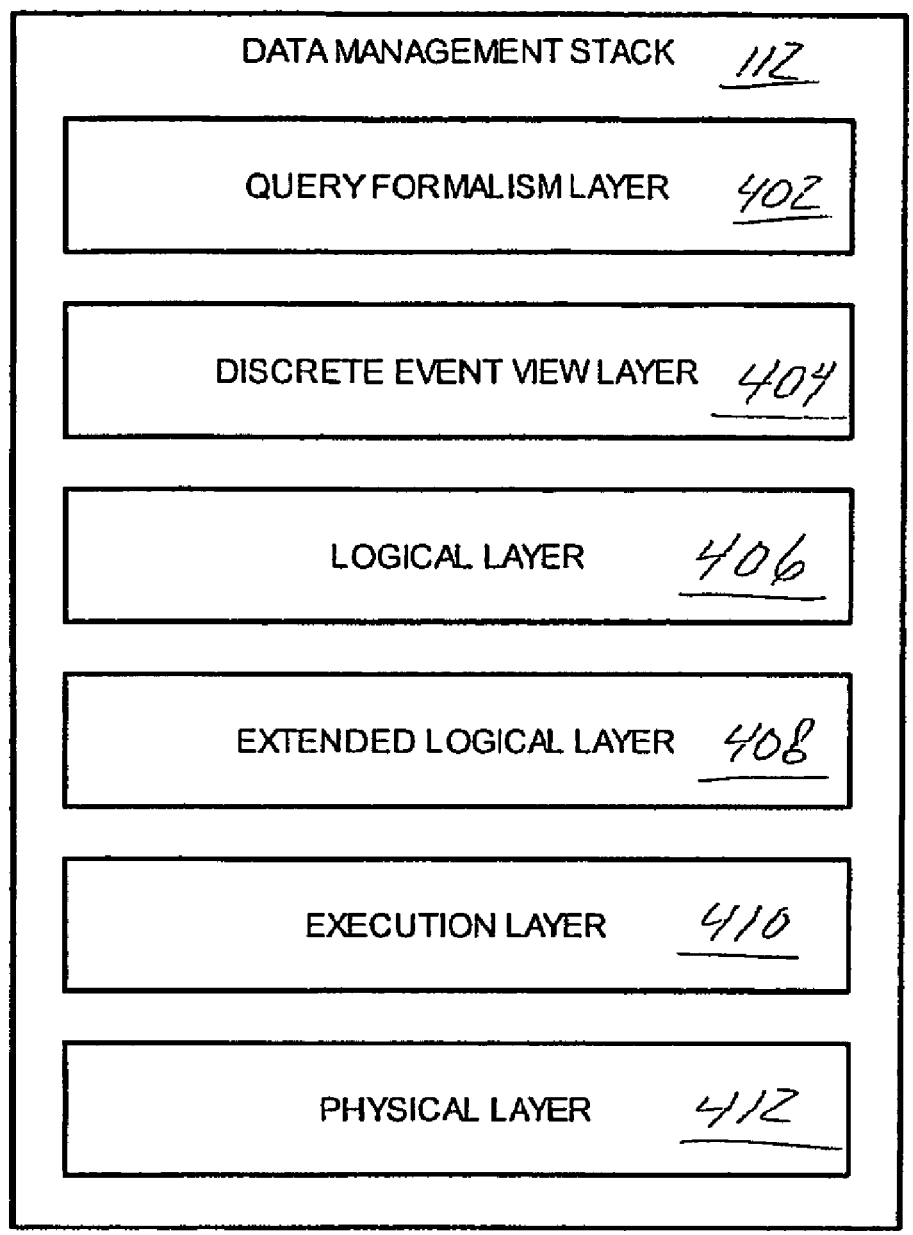
FIG. 4 is a block diagram illustrating one embodiment of a data management stack suitable for use in the wireless sensor network of FIG. 1.

FIG. 4 is a block diagram illustrating one embodiment of a data management stack 112 suitable for use in the wireless sensor network 100 of FIG. 1. The data management interface 110, in the embodiment, shown in FIG. 4, comprises a data management stack 112 that implements multiple layers for performing the functionality required to implement the event-based data management model used in the wireless sensor network 100. Commonly assigned co-pending U.S. patent application, Ser. No. 10/974,073, filed on Oct. 27, 2004, title "LAYERED ARCHITECTURE FOR DATA MANAGEMENT IN A WIRELESS SENSOR NETWORK", is hereby incorporated by reference herein (also referred to here as the "H0006303 Application"). The embodiment of a data management stack 112 shown in FIG. 4 is described in additional detail in the H0006303 Application.

The data management stack 112 includes a query formalism layer 402 that provides the formal framework and language used for querying data from the wireless sensor network 100. The query formalism layer 402 receives the query in source form from a user and compiles the query in order to produce a binary form of the query for execution by the nodes in the wireless sensor network 100. One example of a query language suitable for use in such an embodiment is described in the H0006262 Application.

The data management stack 112 also comprises a discrete event view (DEV) layer 404. The DEV layer 404 identifies a "query execution path" between a logical sink and one or more source entities specified in the query. In the simplest case, a single source entity is able to satisfy the query and the node on which the source entity is implemented (that is, the "source node") is located within the wireless transmission range of the node on which the sink entity is implemented (that is, the "sink node"). In this case, the query execution path includes a single subscription. In other cases, a query is implemented using a set of subscriptions (also referred to here as a "recursive subscription"). For example, it is often the case that no single node in the network is able to satisfy a particular query. Also, it is often the case that a particular data source necessary to satisfy a query is outside of the wireless transmission range of the sink node for the query. The query execution path, in these cases, includes multiple subscriptions that provide a path between the ultimate sink node for the query and each of the source nodes for the query.

The DEV layer 404, in the embodiment shown in FIG. 4, also performs semantic checking of the queries (for example, to determine if valid sink and source entities have been specified) and attempts to optimize the queries if possible.

The data management stack 112 also comprises a logical layer 406. The logical layer 406 implements an abstract view of the data in the wireless sensor network 100 using the event-based data model described above in which the wireless sensor network 100 is logically viewed as a set of logical entities that generate discrete events. The data management stack 112, in the embodiment shown in FIG. 4, also comprises an extended logical layer 408 in which application scenario-specific extensions to the logical layer 406 are made. In one implementation, the extended logical layer 408 includes extensions that maintain information related to event dependencies, data dependencies (for example, dependencies between events that are generated by various data sources), aggregation dependencies, replication dependencies, control dependencies (for example, dependencies that exist between various data sources for performing a control operation), actuation dependencies, and availability management (for example, information pertaining to availability of data to indicate, for example, that data should be stored in an intermediary data source for ensuring a desired level of data availability). In one implementation, the extended logical layer 408 is implemented at the base station 104 and at each data source in the network 100.

The data management stack 112, in the embodiment shown in FIG. 4, also comprises an execution layer 410. The execution layer 410 of the data management stack 112 executes, at appropriate nodes in the network 100, the binary form of the query. The execution layer 410, in one such embodiment, also provides an abstract view and snap-shot, both static and dynamic, of the execution state of the wireless sensor network 100. The execution layer 410 maintains information pertaining to aggregation points in the network 100, adaptive query operations, query execution points, and replication points. The information maintained by the execution layer 410 is updated in response to every occurrence of an event of interest (that is, every event that is subscribed to) in the network 100. Commonly assigned co-pending U.S. patent application, Ser. No. 10/974,173, filed on Oct. 27, 2004, title "DISCRETE EVENT OPERATORS FOR EVENT MANAGEMENT IN A WIRELESS SENSOR NETWORK", is hereby incorporated by reference herein (also referred to here as the "H0006707 Application"). Commonly assigned co-pending U.S. patent application, Ser. No. 10/974,198, filed on Oct. 27, 2004, title "MACHINE ARCHITECTURE FOR EVENT MANAGEMENT IN A WIRELESS SENSOR NETWORK", is hereby incorporated by reference herein (also referred to here as the "H0006708 Application"). The H0006707 Application and the H0006708 Application describe embodiments of discrete event operators and a machine architecture, respectively, suitable for use in implementing an embodiment of the execution layer 410 of the data management stack 112 shown in FIG. 4.

The data management stack 112, in the embodiment shown in FIG. 4, also comprises a physical layer 412 in which network-specific dependencies are managed. Among other things, the physical layer 412 of the data management stack 112 provides an interface between the network routing layer 114 (shown in FIG. 3) and the other layers of the data management stack 112. For example, the execution layer 410 interacts with and uses the services provided by the physical layer 412 to publish events, identify aggregation points and optimize data management functionality.

Figure 5:
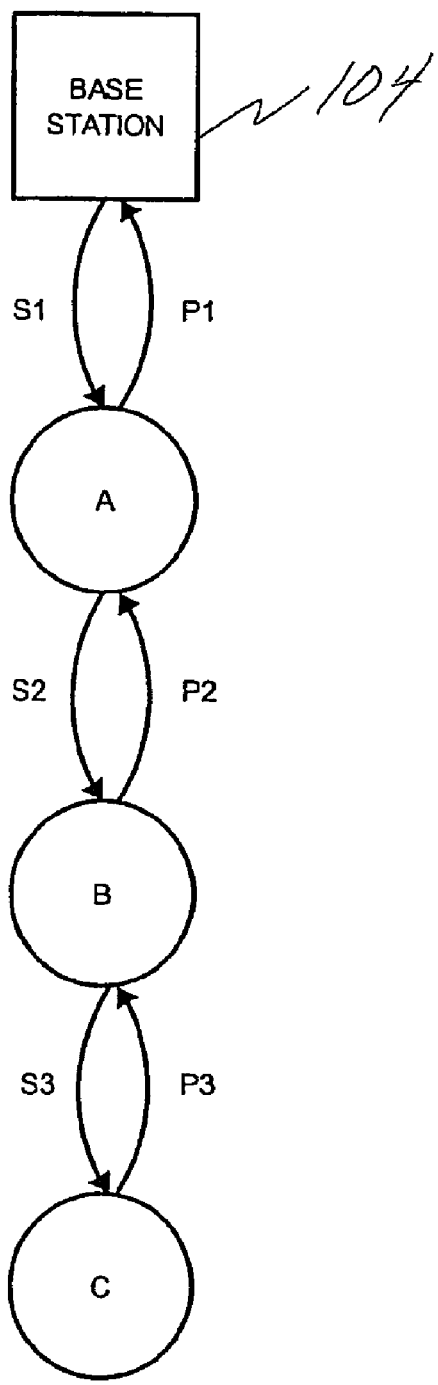
FIG. 5 illustrates one example of a query execution path in the wireless sensor network of FIG. 1.

FIG. 5 illustrates one example of a query execution path in the wireless sensor network 100 of FIG. 1. In the example shown in FIG. 5, a user of the base station 104 formulates a query in a source form and inputs the query to the base station 104. In this example, the query specifies that the base station 104 is the sink node for the query. The query also specifies that the user wishes to receives an average calculated from events that are generated by node C of FIG. 5. However, as shown in FIG. 5, node C is outside of the wireless transmission range of the base station 104. In this example, node C and the base station 104 communicate over a multi-hop data path that includes node A and node B of FIG. 5.

The DEV layer 404 of the data management stack 112 generates the query execution path for the query. The query execution path comprises a set of subscriptions that are used to implement this query. The query execution path, in this example, includes a first subscription (S1) between the base station 104 and node A. The logical sink entity for subscription S1 is implemented on the base station 104 and the logical source entity for subscription S1 is implemented on node A. The query execution path also includes a second subscription (S2) between node A and node B. The logical sink entity for subscription S2 is implemented on node A and the logical source entity for subscription S2 is implemented on node B. The query execution path also includes a third subscription (S3) between node B and node C. The logical sink entity for subscription S3 is implemented on node B and the logical source entity for subscription S3 is implemented on node C.

In this example, node B performs the aggregation operation specified in the query. That is, node B calculates the average of the events generated by node C as specified in the query. Node C publishes events (P3) to node B for subscription S3. Node B receives the events from node C and performs the aggregation operation (that is, calculates the average of events received by node B from node C for subscription S3). Node B publishes the results (P2) of the aggregation operation to node A for subscription S2. Node A receives the results (in the form of an aggregation event) from node B and publishes the aggregation event (P1) to the base station 104 for subscription S1.

Figure 6:
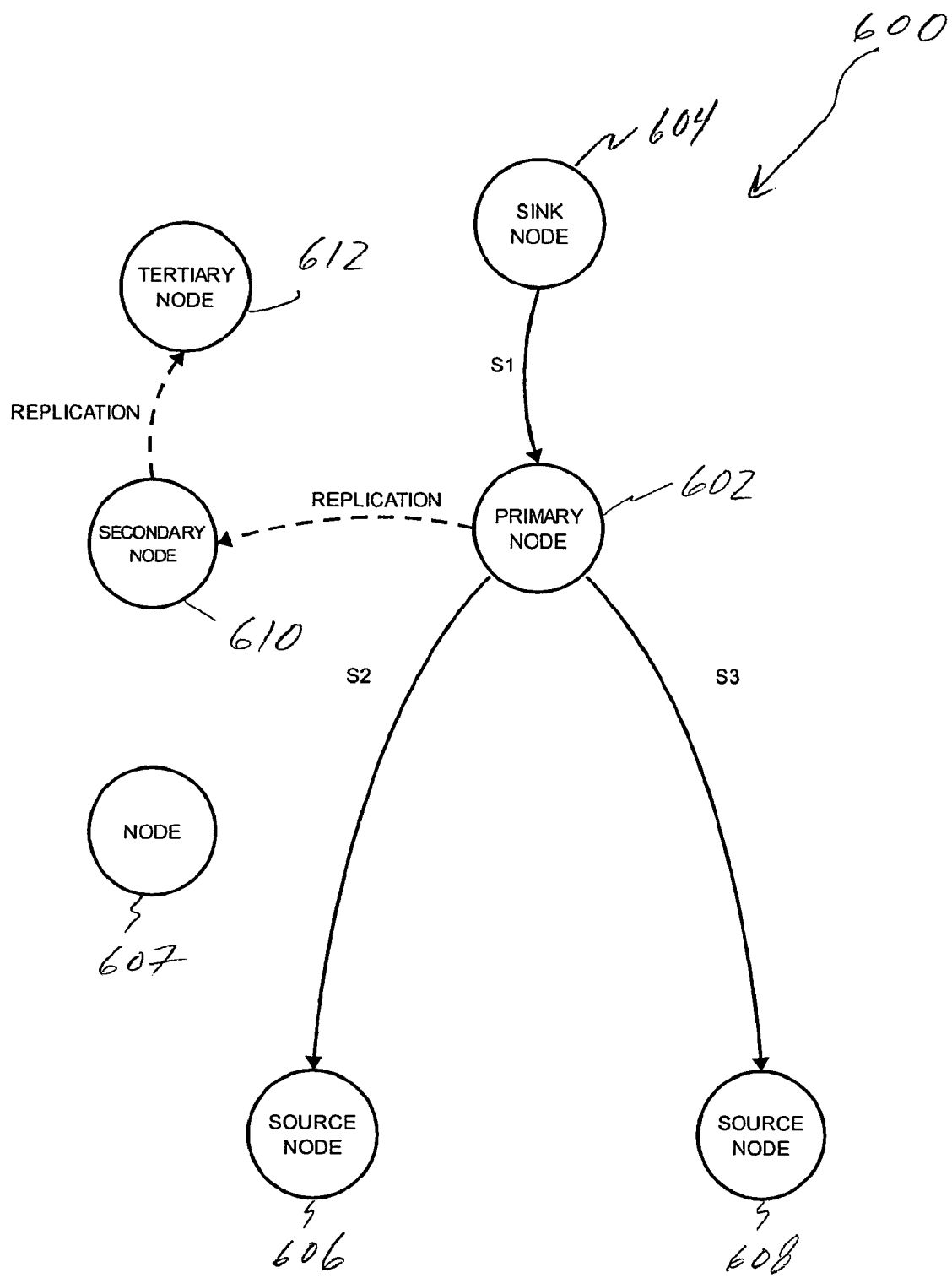
FIG. 6 is a block diagram that illustrates one example of a virtual site.

FIG. 6 is a block diagram that illustrates one example of a virtual site 600. In the example shown in FIG. 6, a query (referred to here as the "example query") is injected into the wireless sensor network 100. A set of subscriptions is generated for the example query that is installed on various nodes along a query execution path for the example query. In this example, a node 602 (referred to here as the "primary node 602") is on the query execution path established for the example query. The primary node 602, in this example, is a source node for a first subscription (S1) and a sink node for a second subscription (S2) and a third subscription (S3). Node 604 is the sink node for the first subscription, node 606 is the source node for the second subscription, and node 608 is the source node for the third subscription. In this particular example, the first subscription (S1) specifies that the primary node 602 perform an aggregation operation that is a function of the events published for the second and third subscriptions (S2 and S3). In other words, the first subscription (S1) is dependent on the second and third subscriptions (S2 and S3).

In this example, the example query specifies that a virtual site 600 is to be established at the primary node 602 in order to provide improved data availability and fault tolerance at the primary node 602. The primary node 602, when able to do so, performs the processing required for the first, second and third subscriptions (collectively referred to here as the "set of subscriptions" for the example query). This processing is also referred to here as "primary-node processing." When the primary node 602 is able to perform the primary-node processing for the example query, the primary node 602 and the virtual site 600 are both considered to be in a "normal" state.

Each virtual site includes one or more backup nodes. That is, each virtual site comprises a set of redundant neighbor nodes that includes the primary node and the one or more backup nodes. In the example shown in FIG. 6, the virtual site 600 includes two backup nodes—a secondary node 610 and a tertiary node 612. In this example, each of the backup nodes (that is, nodes 610 and 612) is one hop away from the primary node 602. Data that is sent and received by the primary node 602 for the set of subscriptions (S1, S2, and S3) is replicated at the secondary node 610 and tertiary node 612 as described below. When the primary node 602 is unable to perform the primary-node processing for the set of subscriptions (S1, S2, and S3), the primary node 602 is considered to have "failed" and to be in a "failed" state. In the event that the primary node 602 fails, a process (referred to here as a "fail over" process) is initiated in which one of the backup nodes is selected to perform the primary-node processing for the set of subscriptions (S1, S2, and S3) in place of the primary node 602. As described below, the backup nodes (in one embodiment) are initialized or otherwise prepared to perform the primary-node processing when such a fail over process is performed. In one implementation, such initialization comprises allocating one or more resources to the set of subscriptions for which the backup node serves as a backup (for example, a timer with appropriate clock drift corrections with respect to the primary node).

In the example shown in FIG. 6, the order in which the backup nodes are selected to perform the primary-node processing is defined at the time the virtual site 600 is established. In one embodiment, the order is defined based on factors such as the capabilities of each of the backup nodes, the current load at each of the backup nodes, the delay in activating the backup node, and/or application feedback. In another embodiment, the order is defined at "random" or based on an a priori policy (for example, according to a round-robin scheduling scheme). When the primary node 602 is in a failed state but a backup node is able to successfully perform the primary-node processing for the set of subscriptions, the virtual site 600 is considered to be in a "fail-over" state. In the event that the primary node 602 and all of the backup nodes fail, the virtual site 600 is considered to have "failed" and to be in a "failed" state. The node in the virtual site 600 that is currently performing the primary-node processing is also referred to here as the "current active node" for the virtual site 600.

In the particular example shown in FIG. 6, when the primary node 602 fails, the secondary node 610 is selected to perform the primary-node processing if it is able to do so. If both the primary node 602 and the secondary node 610 fail, the tertiary node 612 is selected to perform the primary-node processing for the set of subscriptions (S1, S2, and S3). If the primary node 602, the secondary node 610, and the tertiary node 612 all fail, the primary-node processing for the set of subscriptions (S1, S2, and S3) for the example query is not able to be performed and the virtual site 600 is considered to have failed.

As used here, the reliability of a single node in a wireless sensor network 100 refers to the probability that the node is failure-free during a particular interval $(0,T^0)$ of the lifetime a given query or subset thereof. In other words, node reliability is the probability that the lifetime of a particular node is larger than or equal to the lifetime of the query or subset thereof. The lifetime of a query is also referred to here as the "query interval" $T^0$ of the query.

A virtual site of the type shown in FIG. 6 implements a parallel-redundant system. The reliability of such a virtual site can be formalized as follows. The set of nodes used to implement a virtual site are represented as:

$$x\{x1,x2,x3\}$$

where x1 represents the primary node, x2 represents the secondary node, and x3 represents the tertiary node.

A set of random lifetimes for the set of nodes in the virtual site 600 is represented as:

$$\xi\{\xi 1,\xi 2,\xi 3\}$$

where $\xi 1$ represents the lifetime of the primary node, $\xi 2$ represents the lifetime of the secondary node, and $\xi 3$ represents the lifetime of the tertiary node.

The lifetime of a virtual site is represented as:

$$T(x,\xi)$$

Since the virtual site is a parallel-redundant system, the lifetime of the virtual site can be expressed as:

$$T(x, \xi) = \max_{i=1,2,3} \xi i$$

The probability that the lifetime of the virtual site $T(x,\xi)$ is greater than or equal to the query interval or subset thereof of interest $T^0$ is expressed as:

$$Pr\{T(x,\xi) \geq T^0\}$$

Where a virtual site is used at a particular node in a query execution path, the fault tolerance and reliability at that node is represented by the health of the virtual site. In one embodiment, the health parameters that are measured in order to characterize the health of the virtual site include (i) the failure probability of the virtual site and (ii) the state of the virtual site (that is, whether the virtual site is a failed stated or is in a normal or a fail-over state).

Figure 7:
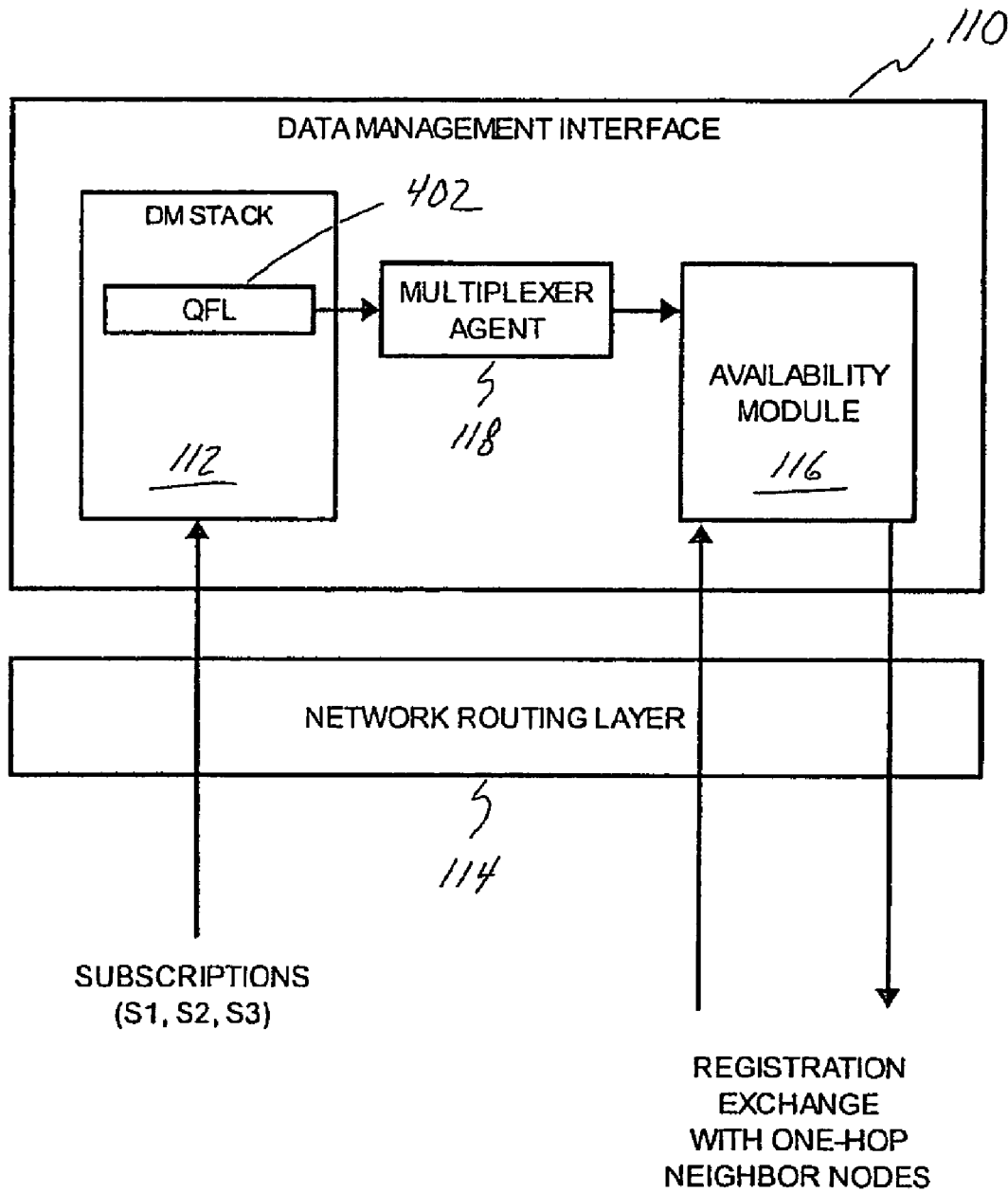
FIG. 7 is a block diagram illustrating the operation of the data management interface of the primary node during establishment of the exemplary virtual site shown in FIG. 6.

FIG. 7 is a block diagram illustrating the operation of the data management interface 110 of the primary node 602 during establishment of the exemplary virtual site 600 shown in FIG. 6. In the example shown in FIGS. 6-7, the availability module 116 of the primary node 602 uses "asynchronous subscription notification" coupled with a "future response" architecture to interface with the query formalism layer 402 of the data management stack 112 in the primary node 602. When a query is installed at a node, the query formalism layer 402 in the data management stack 112 at that node determines whether a virtual site is to be formed at that node for the query. In one implementation of such an embodiment, the user is able to specify in the query whether a virtual site is to be established at one or more nodes in the query execution path generated for that query. In another implementation, a virtual site is automatically (that is, without requiring the user to make an explicit request) established at one or more nodes in the query execution path generated for that query.

In the example shown in FIG. 7, when the query formalism layer 402 in the primary node 602 determines that the virtual site 600 is to be established at the primary node 602, the query formalism layer 402 asynchronously notifies the multiplexer agent 118 in the primary node 602. The query formalism layer 402 provides information related to the set of subscriptions for the example query (also referred to here as "subscription information") to the multiplexer agent 118, which in turn forwards the subscriber information to the availability module 116 of the primary node 602.

In such an embodiment, the data management stack 112 does not synchronize the processing it performs for the set of subscriptions with the notification of the multiplexer agent 118 and the registration process (described below) performed by the availability model 116. The use of a multiplexer agent 118 in this way enables the data management stack 112 of the primary node 602 to be transparent to the requirements of the availability module 116 of the primary node 602. The multiplexer agent 118 can be used to communicate with other modules in addition to or instead of the availability module 116, which provides a convenient way to add functionality without requiring major changes to the data management stack 112. Moreover, the use of asynchronous notification decouples the data management stack 112 from the availability module 116. As a result, the data management stack 112 need not be blocked while the availability module 116 is notified about the current set of subscriptions. In one implementation, the availability module 116 is transparent from (that is, its processing is not based on) a time window used by the data management stack 112 to perform the primary-node processing for the example query (for example, to perform any aggregation operations for the set of subscriptions).

When the availability module 116 of the primary node 602 receives the subscription information from the multiplexer agent 118, the availability module 116 interacts first with the network routing layer 114 of the primary node 602 in order to select a set of one-hop neighbor nodes of the primary node 602 that can act as backup nodes for the primary node 602. The availability module 116 of the primary node 602 provides the network routing layer 114 with the size of a replication module that is to be installed and executed at each backup node (referred to here as the "replication module size"), the amount of memory required to store the binary form of the set of subscriptions (referred to here as the "subscription size"), and an estimate of the size of the data that will be replicated for the set of subscriptions (referred to here as the "estimated replicated data size"). The sum of the replication module size, the subscription size, and the replicated date estimate is also referred to here as the "total replication size" for the set of subscriptions. The replication module comprises the software that is executed by the execution layer 410 and the availability module 116 at each backup node to perform the replication and redirection processing described here as being performed at each backup node. The replication module size includes the memory required for the replication module binary (that is, the executable form of the module), any associated operating system executables or libraries, and any memory used by the replication module to store data when it is executed.

The network routing layer 114 of the primary node 602 uses the underlying routing protocol to identify any one-hop neighbor nodes that would be able to act as backup nodes for the example query. The network routing layer 114 uses the provided subscription information to make this determination. In this example, the network routing layer 114 does this by identifying those one-hop neighbors of the primary node 602 that have enough available local memory to store the replication module, the set of subscriptions, and any replicated data for the set of subscriptions. If the network routing layer 114 determines that there are no suitable one-hop neighbors, the network routing layer 114 informs the availability module 116 of the primary node 602 of that fact. When no suitable one-hop neighbors are identified, the virtual site 600 cannot be established and the process of establishing a virtual site 600 is terminated.

In the example, shown in FIGS. 6-7, the network routing layer 114 of the primary node 602 is able to identify at least two one-hop neighbors that are able to act as backup nodes for the example query. The network routing layer 114 provides the addresses of those nodes to the availability module 116 of the primary node 602. The availability module 116 initiates a negotiation process with each of the nodes identified by the network routing layer 114. In this example, this negotiation process involves a four-way handshake (also referred to here as "replication registration").

Figure 8:
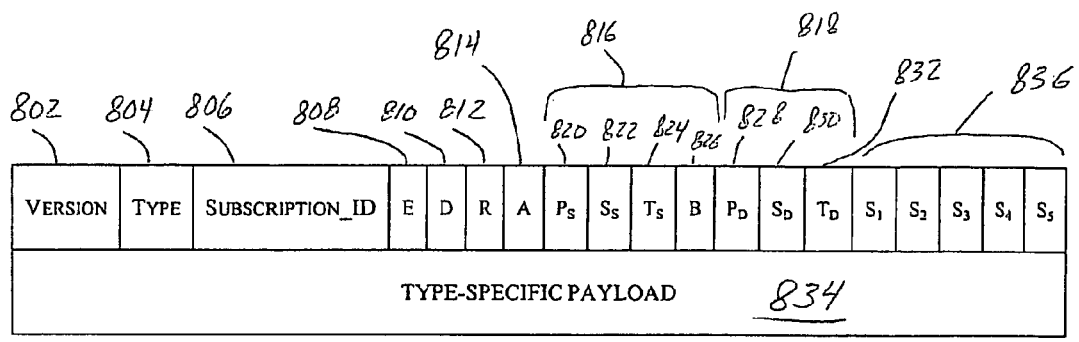
FIG. 8 is a block diagram illustrating one embodiment of a message format for messages that are exchanged by a primary node and its one-hop neighbors during a registration process.

FIG. 8 is a block diagram illustrating one embodiment of a message format for messages that are exchanged by the primary node 602 and the one-hop neighbors during the registration process. Each such message includes a version field 802 that contains a string used to identify the version of the availability module 118 included in the node sending the message (also referred to here as the "source node" for the message). The version field 802, in one embodiment, is used by the receiving node of the message (also referred to here as the "destination node" for the message) in making decisions regarding the compatibility of the availability modules 118 of the source node and destination node. Each such message includes a type field 804 that contains a string that indicates what type of message the message is (for example, a request message, a response message, a commit message, an acknowledgment message, or an informational message). Each type of message, in such an embodiment, has an associated string. Each message includes a subscription identifier field 806 that stores a string containing an identifier for the set of subscriptions. The data management stack 112 uses the subscription identifier field 806 to identify the set of subscriptions, if and when the data management stack 112 receives replicated data for the set of subscriptions. In one implementation, the subscriber identifier used in the primary node 602 and each of the backup nodes is the same so as to avoid confusion in dependant transactions.

Each message also includes an enable field 808 that contains a Boolean that is set when the source node is enabled for the role specified in the source node role fields 816 described below. Each message also includes a deferred field 810 that contains a Boolean that is set when the source node is deferred for (that is, is unable or unwilling to act in) the role specified in the source node role fields 816 described below. Each message also includes a registration field 812 that contains a Boolean that is set when the source node requests that the destination node perform the role specified in the destination node role fields 818 for the for the destination node. Each message also includes an acknowledgement field 814 that contains a Boolean that is set by the source node to indicate that the destination node should acknowledgment receipt of the message.

As noted above, each message also includes source node role fields 816 and the destination node role fields 818 that are used to identify a role for the source node and a role for the destination node, respectively, for the message. In the embodiment shown in FIG. 8, the source role fields 816 include a source primary field 820 that contains a Boolean that is set by the source node to indicate that the particular message relates to the source node acting as the primary node for the set of subscriptions identified in the subscription identifier field 806. The source role fields 816 also include a source secondary field 822 that contains a Boolean that is set by the source node to indicate that the particular message relates to the source node acting as the secondary node for the set of subscriptions identified in the subscription identifier field 806. The source role fields 816 include a source tertiary field 824 that contains a Boolean that is set by the source node to indicate that the particular message relates source node acting as the tertiary (or lower rank) node for the set of subscriptions identified in the subscription identifier field 806. The source role fields 816 include a source busy field 826 that contains a Boolean that is set when the source node is busy.

In the embodiment shown in FIG. 8, the destination role fields 818 include a destination primary field 828 that contains a Boolean that is set by the source node to indicate that the particular message relates to the destination node acting as the primary node for the set of subscriptions identified in the subscription identifier field 806. The destination role fields 818 include a destination secondary field 830 that contains a Boolean that is set by the source node to indicate that the particular message relates to the destination node acting as the secondary node for the set of subscriptions identified in the subscription identifier field 806. The destination role fields 818 include a destination tertiary field 832 that contains a Boolean that is set by the source node to indicate that the particular message relates to the destination node acting as the tertiary (or lower rank) node for the set of subscriptions identified in the subscription identifier field 806. In the particular embodiment shown in FIG. 8, each message also includes additional subscription fields 836 that can be used, in other messages, to communicate about particular subscriptions included in or associated with the set of subscriptions identified in the subscription identifier field 806. Each message also includes a type-specific payload field 834 that includes data specific to a particular type of message.

Figure 9:
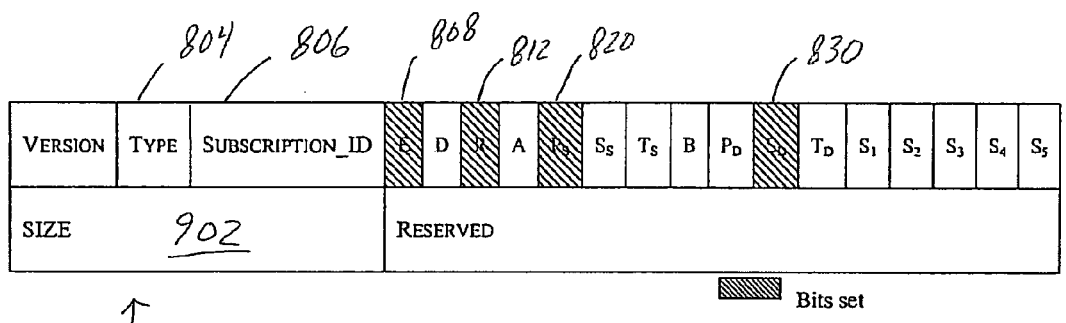
FIG. 9 is a block diagram of one embodiment of a request message.

In the replication registration process, the availability module 116 of the primary node 602 sends a message (referred to here as a "request" message) to all of the one-hop neighbors that were identified by the network routing layer 114 as being able to act as backup nodes for the example query. FIG. 9 is a block diagram of one embodiment of a request message 900. The request message 900 shown in FIG. 9 uses the message format shown in FIG. 8. The type field 804 of the request message 900 contains a string indicating that the message 900 is a request message and the subscriber identifier field 806 contains a string identifying the set of subscriptions for which the request message is being sent. In the example shown in FIG. 9, the enable field 808 and the source primary field 820 are set, which indicates that the source node (the primary node 602 in this example) is acting as the primary node for the set of subscriptions identified in the subscription identifier field 806. Also, in the example shown in FIG. 9, the registration field 812 and the destination secondary field 830 are set by the source node (the primary node 602 in this example) to request that the destination node (a one-hop neighbor node of the primary node 602 in this example) act as the secondary node for the set of subscriptions identified in the subscription identifier field 806. The type-specific field 834 of a request message 900 comprises a size field 902 in which the total replication size for the set of subscriptions identified in the subscription identifier field 806 is stored. The total replication size stored in the size field 902 is used by the destination node to determine if the destination node is able to act as the secondary node for the set of subscriptions identified in the subscription identifier field 806.

Figure 10A:
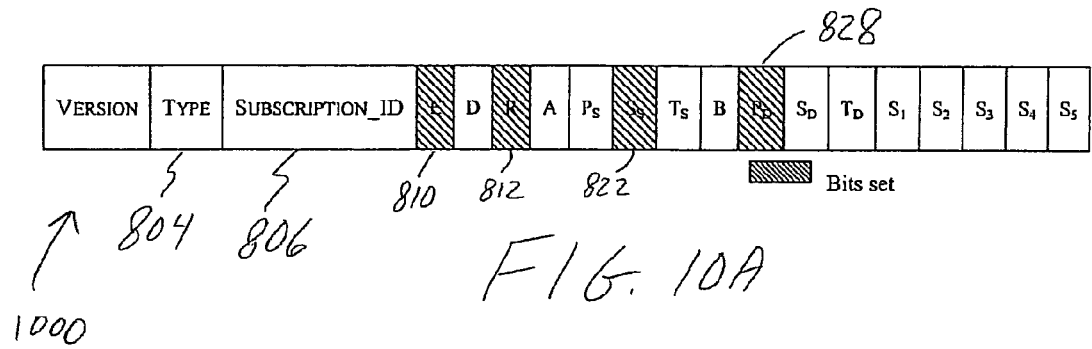
FIGS. 10A-10B are block diagrams of one embodiment of a response message in which a one-hop neighbor indicates it is able to act as a secondary node and a response message in which a one-hope neighbor indicates it is unable to act as a secondary node, respectively.
Figure 10B:
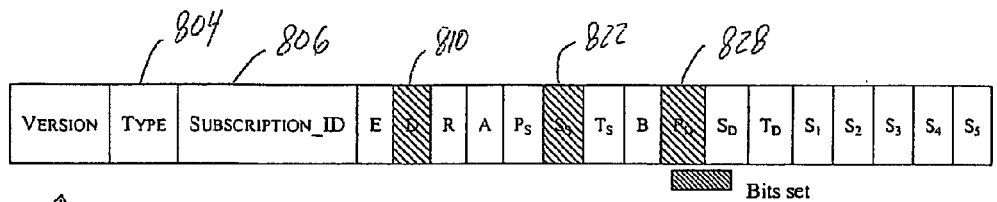

When a one-hop neighbor node receives a request message 900, the one-hop neighbor node determines if it is able to act as a secondary node for the set of subscriptions identified in the request message 900 (the set of subscriptions S1, S2, and S3). This determination is made by the availability module 116 at that one-hop neighbor node. The availability module 116 uses the size field 902 contained in the request message 900 to determine if there is sufficient available memory at that node to store the replication module, the set of subscriptions, and any replicated data. The availability module 116 of the one-hop neighbor node sends a message (referred to here as a "response message") to the primary node 602 indicating whether or not the one-hop neighbor node is able to act as the secondary node for that subscription. FIGS. 10A-10B are block diagrams of one embodiment of a response message 1000 in which a one-hop neighbor indicates it is able to act as a secondary node and a response message 1020 in which a one-hope neighbor indicates it is unable to act as a secondary node, respectively. The response messages 1000 and 1020 shown in FIGS. 10A-10B, respectively, use the message format shown in FIG. 8. The type field 804 of the request messages 1000 and 1020 contain a string indicating that the messages 1000 and 1020 is a response message and the subscriber identifier field 806 contains a string identifying the set of subscriptions for which the respective message is being sent. In the examples shown in FIGS. 10A-10B, the response messages 1000 and 1020 do not include any data in the type-specific payload field 834.

In the example shown in FIG. 10A, the enable field 808 and the source secondary field 822 are set, which indicates that the source node is able and willing to act as the secondary node for the set of subscriptions identified in the subscription identifier field 806. Also, in the example shown in FIG. 10A, the registration field 812 and the destination primary field 828 are set by the source node to indicate that the source node understands that the destination node for the message 1000 (the primary node 602 in this example) is the primary node for the set of subscriptions identified in the subscription identifier field 806. In the example shown in FIG. 10B, the defer field 810 and the source secondary field 822 are set, which indicates that the source node is not able or willing to act as the secondary node for the set of subscriptions identified in the subscription identifier field 806. Also, in the example shown in FIG. 10B, the destination primary field 828 is set by the source node to indicate that the source node understands that the destination node for the message 1020 (the primary node 602 in this example) is the primary node for the set of subscriptions identified in the subscription identifier field 806.

Figure 11:
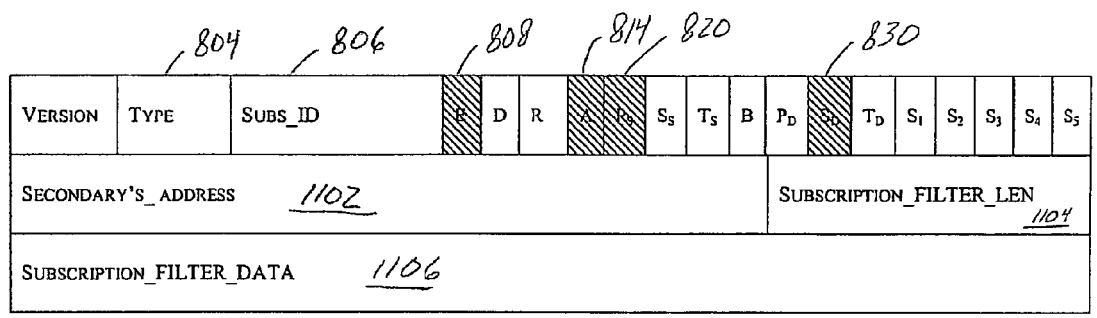
FIG. 11 is a block diagram of one embodiment of a confirmation message.

In the example shown in FIGS. 6-7, the nodes 610 and 612 send response messages 1000 indicating that those nodes 610 and 612 are able to act as a secondary node for the set of subscriptions. In this example, it so happens that the availability module 116 of the primary node 602 first receives the response message sent from node 610 and then later receives the response message sent from node 612. When the availability module 116 at the primary node 602 receives the response message from the node 610, the availability module 116 of the primary node 602 sends a message (referred to here as a "confirmation message") to the availability module 116 of the node 610 confirming that node 610 is to be the secondary node for the set of subscriptions identified in the message. FIG. 11 is a block diagram of one embodiment of a confirmation message 1100. The confirmation message 1100 shown in FIG. 11 uses the message format shown in FIG. 8. The type field 804 of the confirmation message 1100 contains a string indicating that the message 1100 is a confirmation message and the subscriber identifier field 806 contains a string identifying the set of subscriptions for which the confirmation message 1100 is being sent. In the example shown in FIG. 11, the source primary field 820 is set, which indicates that the source node (the primary node 602 in this example) is acting as the primary node for the set of subscriptions identified in the subscription identifier field 806. Also, in the example shown in FIG. 11, the enable field 808, the acknowledge field 814, and the destination secondary field 830 are set by the source node to confirm the destination node (node 610 in this example) is to act as the secondary node for the set of subscriptions identified in the subscription identifier field 806 and to indicate that the destination should acknowledge receipt of the message 1100. The type-specific field 834 of a commit message 1100 comprises the address of the secondary node 610 (field 1102), the length of the binary form of (that is, the event filters for) the set of subscriptions identified in the subscription identifier field 806 (field 1104), and the binary form of the set of subscriptions identified in the subscription identifier field 806 (field 1106).

Figure 12:
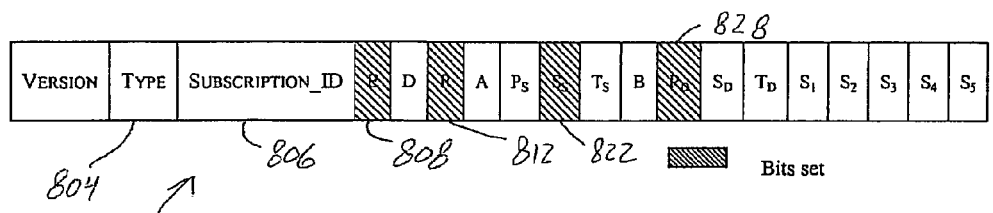
FIG. 12 is a block diagram of one embodiment of an acknowledgment message.

The availability module 116 of node 610, after it receives the confirmation message, sends a message (referred to here as an "acknowledgment message") to the primary node 602 indicating that the node 610 successfully received the confirmation message and confirming that the node 610 is acting as the secondary node for the set of subscriptions identified in the message. FIG. 12 is a block diagram of one embodiment of an acknowledgment message 1200. The acknowledgment message 1200 shown in FIG. 12 uses the message format shown in FIG. 8. The type field 804 of the acknowledgment message 1200 contains a string indicating that the message 1200 is an acknowledgment message and the subscriber identifier field 806 contains a string identifying the set of subscriptions for which the acknowledgment message is being sent. The acknowledgment message 1200, in this example, does not include any data in the type-specific payload field 834. In the example shown in FIG. 12, the enable field 808 and the source secondary field 822 are set by the source node to acknowledge that the source node (the secondary node 610 in this example) is acting as the secondary node for the set of subscriptions identified in the subscription identifier field 806. Also, in the example shown in FIG. 12, the registration field 812 and the destination primary field 828 are set, which indicates that the source node understands that the destination node for the message 1200 (the primary node 602 in this example) is the primary node for the set of subscriptions identified in the subscription identifier field 806.

When the availability module 116 at the primary node 602 receives the response message from node 612, indicating that the neighbor node is able to act as a secondary node for the subscription, the availability module 116 of the primary node 602 sends a confirmation message to the availability module 116 of node 612 indicating that node 612 is to be the tertiary node for the set of subscriptions identified in the message. The confirmation message, in this example, is the same as the confirmation message 1100 shown in FIG. 11 except that the destination tertiary field 832 is set (instead of the destination secondary field 830 as is shown in FIG. 11). Such a confirmation message also includes the address of the secondary node 610, the length of the binary form of the set of subscriptions identified in the subscription identifier field 806, and the binary form of the set of subscriptions identified in the subscription identifier field 806. The availability module 116 of node 612, after it receives the confirmation message, sends an acknowledgment message to the primary node 602 indicating that the node 612 successfully received the confirmation message and confirming that the node 612 is acting as the tertiary node for the set of subscriptions identified in the message. The acknowledgment message, in this example, is the same as the acknowledgment message 1200 shown in FIG. 12 except that the source tertiary field 824 is set (instead of the source secondary field 822 as is shown in FIG. 12).

Figure 13:
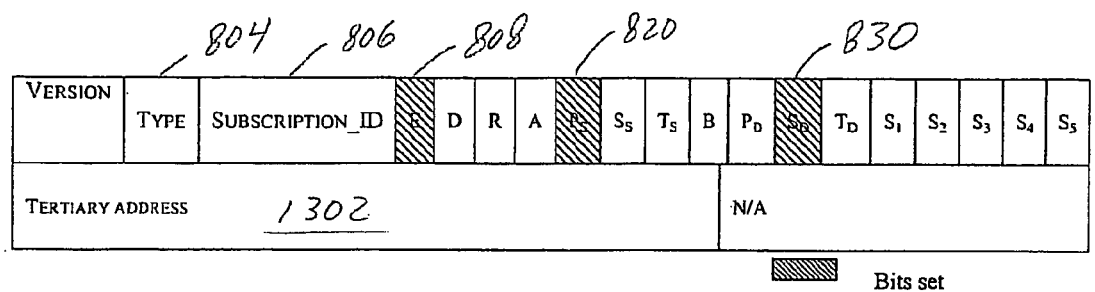
FIG. 13 is a block diagram of one embodiment of an informational message.

When the availability module 116 at the primary node 602 has identified the secondary node 610 and the tertiary node 612, the availability module 116 at the primary node 602 ignores any other response messages it thereafter receives. The availability module 116 of the primary node 602 sends an informational message to the availability module 116 of the secondary node 610 informing the secondary node 612 of the address of the tertiary node 612 for the set of subscriptions identified in the message. FIG. 13 is a block diagram of one embodiment of an informational message 1300. The informational message 1300 shown in FIG. 13 uses the message format shown in FIG. 8. The type field 804 of the informational message 1300 contains a string indicating that the message 1300 is an acknowledgment message and the subscriber identifier field 806 contains a string identifying the set of subscriptions for which the acknowledgment message is being sent. In the example shown in FIG. 11, the enable field 808 and the source primary field 820 are set, which indicates that the source node (the primary node 602 in this example) is acting as the primary node for the set of subscriptions identified in the subscription identifier field 806. Also, in the example shown in FIG. 13, the registration field 812 is not set and the destination secondary field 830 is set, which confirms that the destination node (the secondary node 610 in this example) is the secondary node for the set of subscriptions identified in the subscription identifier field 806. The type-specific field 836 of an acknowledgment message 1300 comprises the address of the tertiary node 612 (field 1302).

The availability module 116 of the primary node 602 also communicates a virtual site node list for the virtual site 600 that has been established to each one-hop neighbor of the primary node 602 (which includes the secondary node 610 and the tertiary node 612). The virtual site node list comprises a subscription identifier that identifies the subscription that the list is associated with and a unique address (or other identifier) of the primary node 602, the secondary node 610, and the tertiary node 612. The availability modules 116 in the secondary node 610 and the tertiary node 612 forward the virtual site node list received from the primary node 602 to the one-hop neighbors of the secondary node 610 and the tertiary node 612, respectively. The virtual site node list for the virtual site 600 is used in, among other things, the one-hop acknowledgment processing described below.

In this embodiment, "future response" is used. That is, the data management stack 112 of the primary node 602 is decoupled from the availability module 116 and need not know about the availability issues handled by the availability module 116 or be aware of the virtual site 600. In such an embodiment, the data management stack 112 of the backup nodes are aware of the virtual site 600 for which they are backup nodes. For example, where the data management stack 112 of the primary node 602 needs information related to quality of service (QoS), the data management stack 112 of the primary node 602 can query the availability module 116 of the primary node 602 for such information. In this way, the data management stack 112 of the primary node 602 need not be notified of any information regarding formation of the virtual site 600, the status of virtual site 600, the role of the primary node 602 in the virtual site 600, and the like.

The user who formulated the current query need only directly interact with the data management stack 112 of the primary node 602 in order to specify a desired level of availability or other QoS parameter (for example, by specifying such parameter in a query). The data management stack 112 of the primary node 602 provides these parameters to the availability module 116 of the primary node 602, which interacts with the backup nodes in the virtual site 600 in order to achieve the QoS specified in the parameters. The availability module 116 of the primary node 602 and the backup nodes of the virtual site 600 work to achieve the desired QoS in a manner that is transparent to the data management stack 112 of the primary node 602. However, the data management stack 112, as noted above, can query the availability module 116 of the primary node 602 for information regarding the QoS data maintained by the availability module 116 of the primary node 602 and/or by the backup nodes of the virtual site 600.

Figure 14:
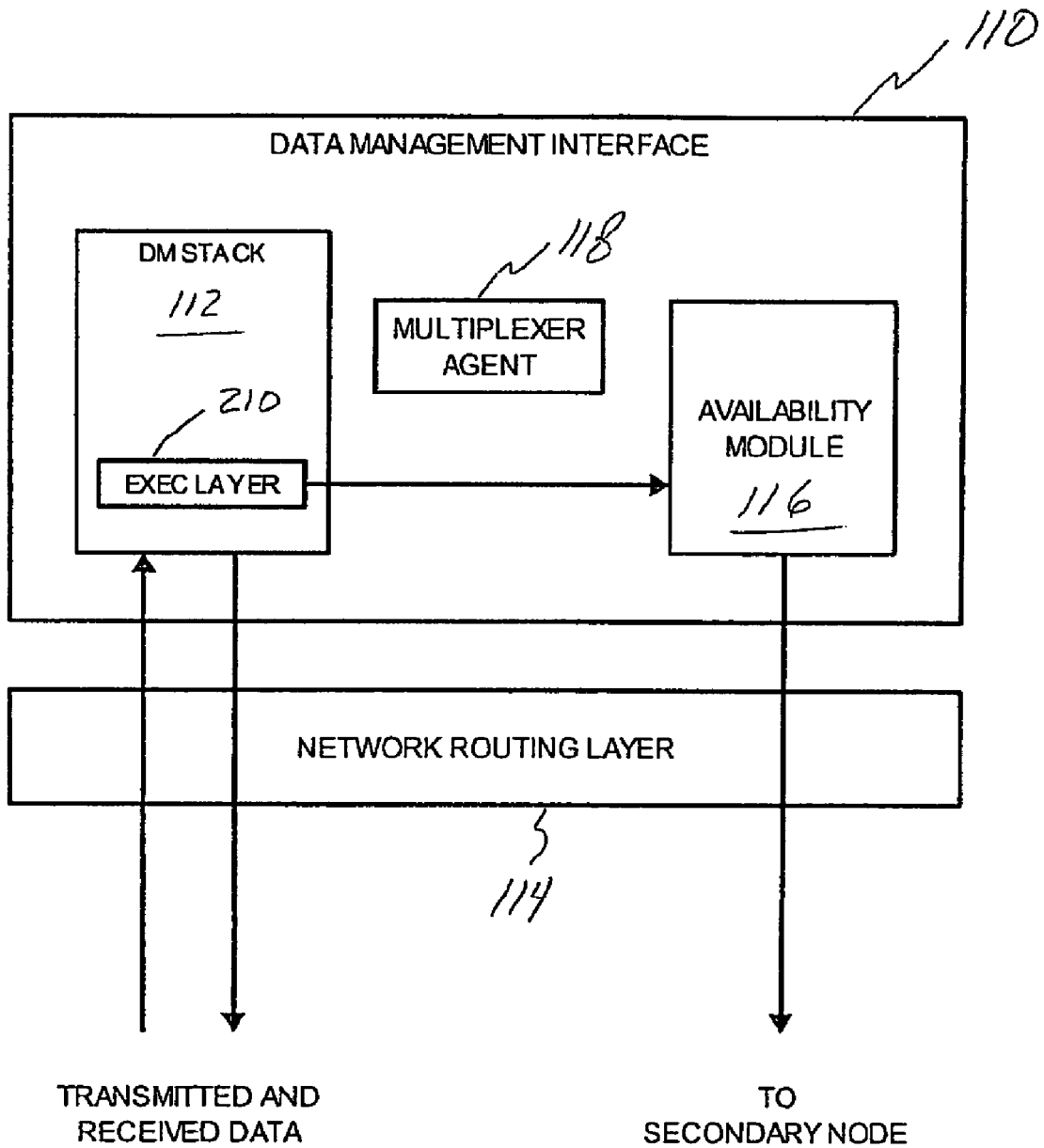
FIG. 14 is a block diagram illustrating the operation of the primary node in the exemplary virtual site shown in FIG. 6.

FIG. 14 is a block diagram illustrating the operation of the primary node 602 in the exemplary virtual site 600 shown in FIG. 6. When the primary node 602 is operating in a normal state, the data management stack 112 of the primary node 602 carries out the primary-node processing for the set of subscriptions (S1, S2, and S3) that were generated for the example query. The data management stack 112 of the primary node 602 need not be aware that the virtual site 600 has been formed for the example query nor be aware of the current status of the virtual site 600. Also, after the virtual site 600 has been successfully established and while the virtual site 600 is in the normal state, the availability module 116 of the primary node 602 replicates, at each of the backup nodes of the virtual site 400 (that is, the secondary node 610 and the tertiary node 612), any data that is received or transmitted by the primary node 602 in connection with the set of subscriptions generated for the example query.

In the example shown in FIG. 14, the execution layer 210 of the data management stack 112 of the primary node 602 directly transfers any data that is received or transmitted by the primary node 602 in connection with the set of subscriptions to the availability module 116 of the primary node 602 for replication. When the set of subscriptions for the example query is installed at the primary node 602, the execution layer 210 is instructed to perform such replication transfers. The execution layer 210 determines when and what types of data to provide to the availability module 116. In this example, there is an aggregation dependency that exists between the first subscription (S1) and the second and third subscriptions (S2 and S3). That is, the event filter for the first subscription (S1) is a function of events published for the second and third subscriptions (S2 and S3) and the execution layer 210 is not able to publish an event for the first subscription (S1) unless it has current events for both the second and third subscriptions (S2 and S3). When the execution layer 210 has received a current event for the second subscription (S2) but has not received a current event for the third subscription (S3), the execution layer 210, in this embodiment, transfers the current event for the second subscription (S2) to the availability module 116 of the primary node 602 for replication. When the execution layer 210 has received current events for both the second and third subscriptions (S2 and S3), the execution layer 210 is able to generate and publish a current event for the first subscription (S1). When this happens, the execution layer 210, in this embodiment, transfers the currents event for the first subscription (S1) to the availability module 116 of the primary node 602 for replication but does not transfer the current events for the second and third subscriptions (S2 and S3) to the availability module 116 for replication (for example, to avoid using the resources that would be required to transmit and store those events).

In the embodiment described here, the availability module 116 at the primary node 602 does not perform any primary-node processing of any data it receives from the execution layer 210 for replication. The availability module 116 of the primary node 602 transmits the data it receives for the example query to the backup nodes (nodes 610 and 612) of the virtual site 600 established for that query. In the event that the availability module 116 of the primary node 602 receives data for replication from the execution layer 210 but the primary node 602 fails before the availability module 116 is able to replicate the received data to the backup nodes of the virtual site 600, the received data is lost.

Figure 15:
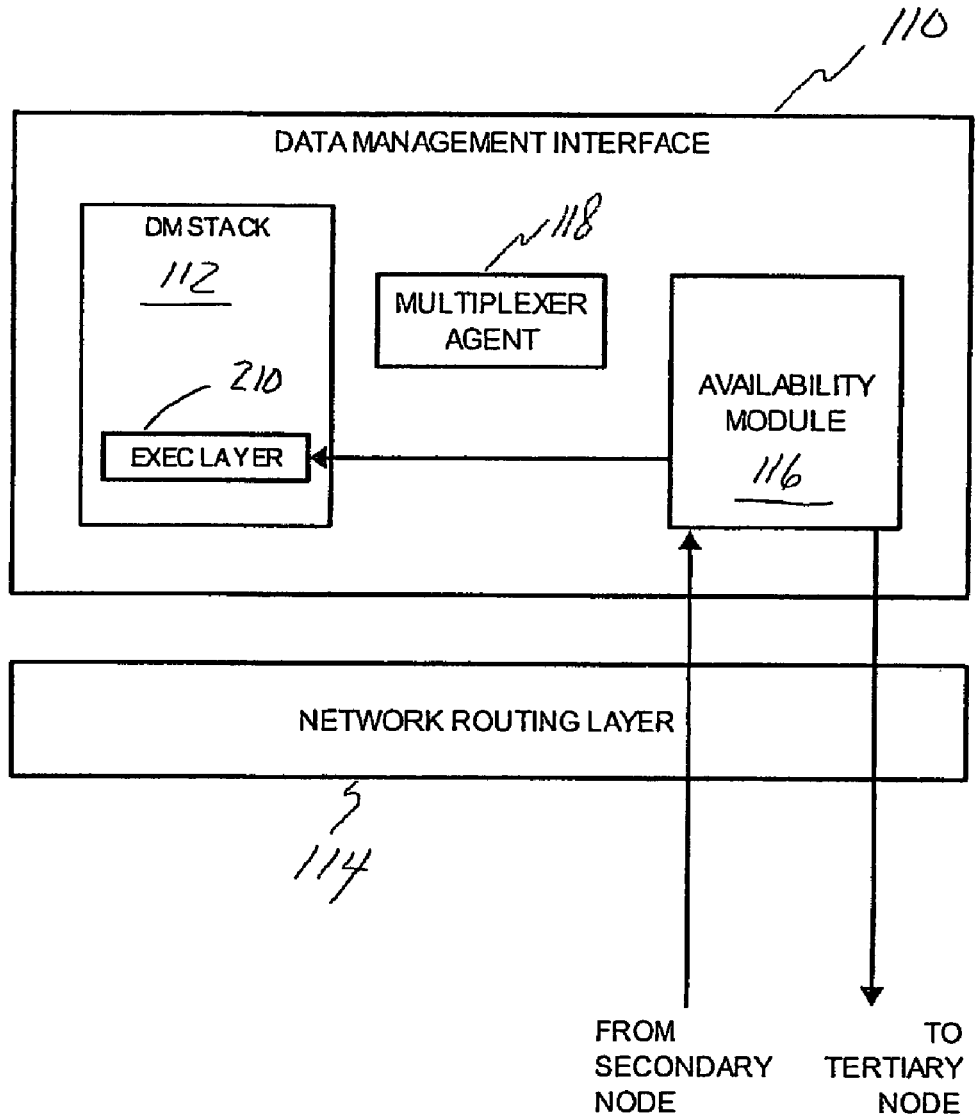
FIG. 15 is a block diagram illustrating the operation of the secondary node in the exemplary virtual site shown in FIG. 6 while the virtual site is in a normal state.

FIG. 15 is a block diagram illustrating the operation of the secondary node 610 in the exemplary virtual site 600 shown in FIG. 6 while the virtual site 600 is in a normal state. When the primary node 602 is operating in a normal state, the availability module 116 of the primary node 602 replicates data that is received and transmitted by the primary node 602 for the set of subscriptions (S1, S2, and S3) for which the virtual site 600 was established. When the primary node 602 is operating in a normal state, the data management stack 112 of the secondary node 610 need not be aware that the secondary node 610 is acting as a backup node for a virtual site 600.

In the example shown in FIG. 15, the availability module 116 of the secondary node 610 uses "transparent subscription replication" coupled with "fail over invocation" to interface with the execution layer 210 of the data management stack 112 at the secondary node 610. When the virtual site 600 is established, the availability module 116 of the primary node 602 transmits to the availability module 116 of the secondary node 610 information about the set of subscriptions (S1, S2, and S3) for which the virtual site 600 is being established (for example, as a part of the registration process described above in connection with FIGS. 8-13). The set of subscriptions (S1, S2, and S3) includes only those subscriptions for which the primary node 602 either acts a source or a sink and need not include any other subscriptions generated for the example query. In this example (as shown in FIG. 6), primary node 602 serves as a source for subscription S1 and as a sink for subscriptions S2 and S3.

The availability module 116 of the secondary node 610 (shown in FIG. 15) receives the subscription information from the primary node 602 and forwards it to the execution layer 210 of the data management stack 112 at the secondary node 610. The execution layer 210 of the data management stack 112 at the secondary node 610 parses the subscription information. As a part of this processing, the execution layer 210 identifies any aggregation dependencies for the set of subscriptions (S1, S2, and S3). In one implementation of such an embodiment, the execution layer 210 also allocates one or more resources to the set of subscriptions (S1, S2, and S3). For example, if the set of subscriptions (S1, S2, and S3) comprises one or more subscriptions that have a limited lifetime, one or more timers (with appropriate clock drift corrections with respect to the primary node 602) are allocated for the set of subscriptions for use in determining when such lifetimes have expired. The execution layer 210 at the secondary node 610 also manages the local memory of the secondary node 610 using, for example, the subscription information it has received and/or one or more management policies (for example, a policy giving a preference to newer subscriptions).

In the example shown in FIG. 15, when the availability module 116 of the secondary node 610 receives replicated data from the availability module 116 of the primary node 602 for the set of subscriptions (S1, S2, and S3), the availability module 116 of the secondary node 610 directly transfers the replicated data to the execution layer 210 of the data management stack 112 at the secondary node 610. The execution layer 210 buffers the received replicated data in the local memory of the secondary node 610. In one implementation, the execution layer 210 performs partial processing for the subscriptions using such buffered data (for example, running a timer allocated for the set of subscriptions). The secondary node 610 does not otherwise perform any primary-node processing using the replicated data while the virtual site 600 is in a normal state. For example, the secondary node 610, in such an embodiment, does not serve as a caching point for the set of subscriptions nor does the secondary node 610 use the replicated data to serve or process other queries or subscriptions.

The availability module 116 of the secondary node 610, in the embodiment shown in FIG. 15, also replicates the received replicated data to the tertiary node 612. In other embodiments, the availability module 116 of the primary node 602 transmits the replicated data directly to all of the backup nodes in the virtual site.

In the example shown in FIG. 15, the availability module 116 of the secondary node 610 does not perform any primary-node processing of the replicated data it receives from the availability module 116 of the primary node 602 for the set of subscriptions (S1, S2, and S3). That is, the availability module 116 of the secondary node 610 does not perform any aggregation or other processing on the replicated data it receives for the set of subscriptions (S1, S2, and S3) and need not be aware of the content of such data. As a result, the availability module 116 of the secondary node 610 need not parse the content of the replicated data it receives while the virtual site 600 is in a normal state.

In this example, the replication processing performed by the secondary node 610 partially decouples the data management stack 112 of the secondary node 610 from the availability module 116 of the secondary node 610. The availability module 116 of the secondary node 610, when the secondary node 610 is selected to serve as the secondary node for the virtual site 600, determines that there is adequate local memory available at the secondary node 610 to buffer the replicated data it will receive from the primary node 602 for the set of subscriptions (S1, S2, and S3), though, in this embodiment, the availability module 116 does not explicitly reserve the memory. As noted above, the execution layer 210 of the data management stack 112 of the secondary node 610 manages the local memory of the secondary node 610 based on, for example, any aggregation dependencies for the set of subscriptions (S1, S2, and S3).

In such an embodiment, the execution layer 210 in the secondary node 610 is able to distinguish between data (also referred to here as "network data") the execution layer 210 receives in connection with other processing it performs (for example, processing related to subscriptions for other queries) and replicated data the execution layer 210 receives for the set of subscriptions (S1, S2, and S3) since the replicated data is received directly from the availability module 116 of the secondary node 610 while the network data is received directly from the network routing layer 114 of the secondary node 610.

In this example, the tertiary node 612 performs similar replication processing as the secondary node 612. When the virtual site 600 is established, the availability module 116 of the primary node 602 transmits to the availability module 116 of the tertiary node 612 information about the set of subscriptions (S1, S2, and S3) for which the virtual site 600 is being established (for example, as a part of the registration process described above in connection with FIGS. 8-13). The availability module 116 of the tertiary node 612 receives the subscription information and forwards it to the execution layer 210 of the data management stack 112 at the tertiary node 612. When the availability module 116 of the tertiary node 612 receives replicated data from the availability module 116 of the secondary node 610 for the set of subscriptions (S1, S2, and S3), the availability module 116 of the tertiary node 612 directly transfers the received replicated data to the execution layer 210 of the tertiary node 612, which processes the replicated data in the same manner that the execution layer 210 of the secondary node 610 processes the replicated data. The availability module 116 of the tertiary node 612, however, does not replicate the replicated data it receives for the set of subscriptions (S1, S2, and S3).

Figure 16:
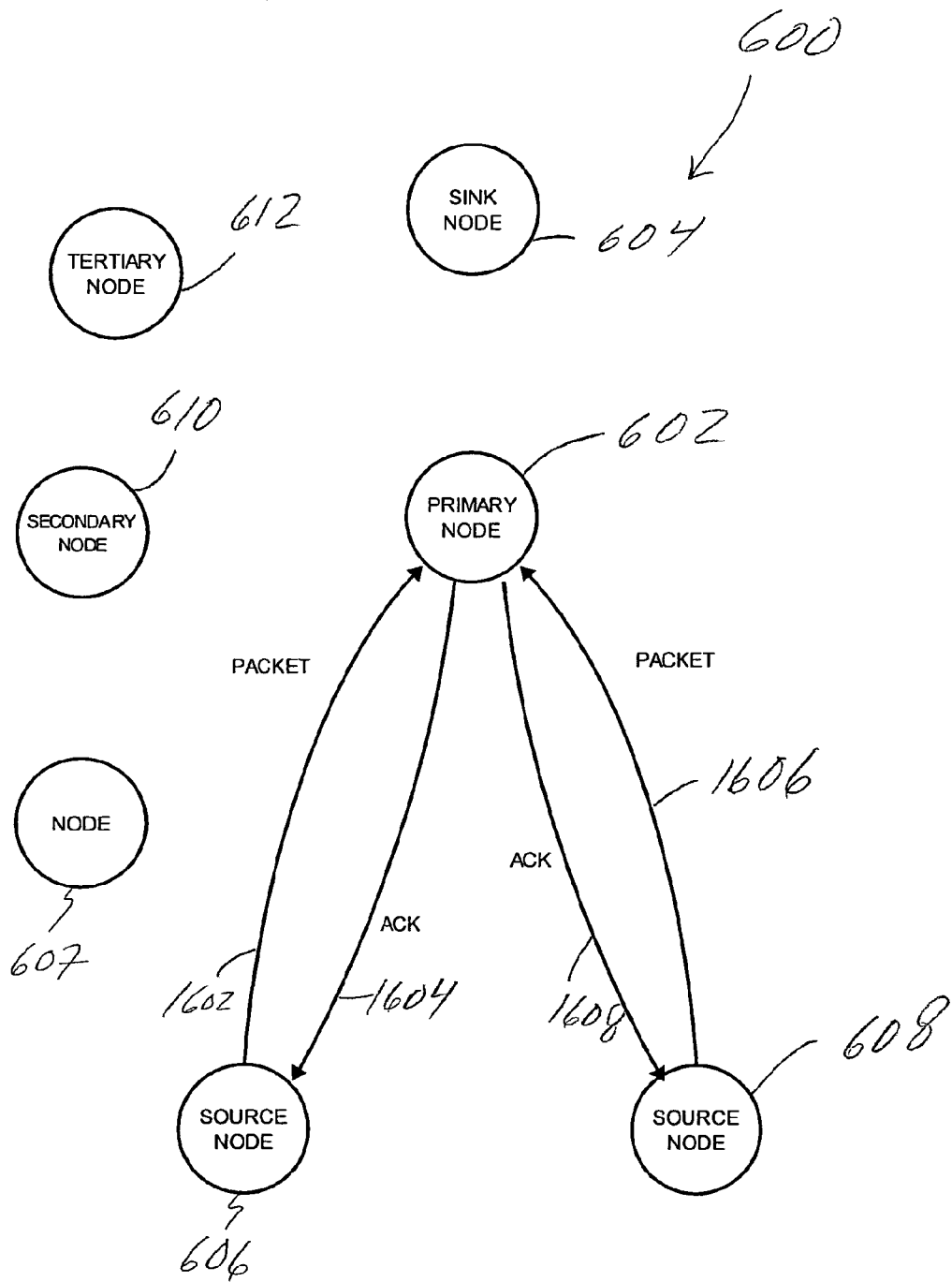
FIG. 16 is a block diagram illustrating the operation of a last-hop acknowledgment scheme used in the exemplary virtual site shown in FIG. 6.

FIG. 16 is a block diagram illustrating the operation of a last-hop acknowledgment scheme used in the exemplary virtual site 600 shown in FIG. 6. In this example, the routing protocol implemented by the network routing layer 114 in each of the nodes of the wireless sensor network 100 makes use of a "last-hop acknowledgment and neighbor redirection" scheme. In such a scheme, when a packet is transmitted as a part of the example query from a one-hop neighbor node of the current active node for the virtual site 600 (which is the primary node 602 when the virtual site 600 is in a normal state), an acknowledgment is transmitted from the current active node to the one-hop neighbor node if the packet is successfully received by the current active node. The acknowledgment is transmitted to confirm that the current active node successfully received the packet. In the example shown in FIG. 16, while the virtual site 600 is in a normal state, when a data 1602 packet is transmitted from the source node 606 to the primary node 602 for the second subscription (S2), the primary node 602 transmits an acknowledgment 1604 to the source node 606 if the primary node 602 successfully receives the data packet. Likewise, while the virtual site 600 is in a normal state, when a data packet 1606 is transmitted from the source node 608 to the primary node 602 for the third subscription (S3), the primary node 602 transmits an acknowledgment 1608 to the source node 608 if the primary node 602 successfully receives the data packet. In this embodiment, the transmission and receipt of such acknowledgments occurs within the network routing layers 114 of the primary node 602 and the source nodes 606 and 608. Also, in this embodiment, an acknowledgment is only sent to the one-hop neighbor node of the current active node and additional acknowledgments for the virtual site 600 are not transmitted to other nodes along the query execution path for the example query.

In this embodiment, as noted above, the virtual site node list for the virtual site 600 is sent by the primary node 602 and the secondary node 610 to their respective one-hop neighbor nodes. The virtual site node list for the virtual site 600 is not dispersed beyond the one-hop neighbor nodes of the primary node 610 and the secondary node 612. In this embodiment, since packets are dropped in the event that primary node 602, the secondary node 610, and the tertiary node 612 all fail, the virtual site node list is not transmitted to the one-hop neighbors of the tertiary nodes 612 and a last-hop acknowledgement need not be sent by the tertiary node 612 when it is performing the primary-node processing for the virtual site 600. In other embodiments, however, this need not be the case. The virtual site node list for the virtual site 600 is revoked (or otherwise discarded) by the nodes when the lifetime of the example query (and the virtual site 600) expires.

The virtual site node list for the virtual site 600 is maintained in both the availability module 116 and the network routing layer 114 of each such one-hop neighbor node (including the secondary node 610 and the tertiary node 612). The network routing layer 114 and the availability module 116 can have virtual site node lists for multiple virtual sites. The availability module 116 uses the subscription identifier to identify the appropriate virtual site node list for a given set of subscriptions (and query).

In such a routing protocol, an acknowledgment is sent for a given packet if that packet is transmitted to a virtual site as a part of a subscription handled by the virtual site. If that is the case, a particular bit (also referred to here as the "virtual site bit") in the packet's header is set and the destination address of the packet corresponds to a node contained in at least one virtual site node list maintained at the network routing layers 114 in the transmitting node and the receiving node. The network routing layers 114 in the transmitting node and the receiving node check if the virtual site bit in the packet's header is set and if the destination address for the packet is included in at least one virtual site node list maintained by the network routing layers 114 of the transmitting node and the receiving node. If either of these conditions is false, the receiving node does not transmit, and the transmitting node does not expect to receive, an acknowledgment for the packet. If both condition are true, the receiving node transmits (if it successfully receives the packet), and the transmitting node expects to receive, an acknowledgment for the packet.

Figure 17A:
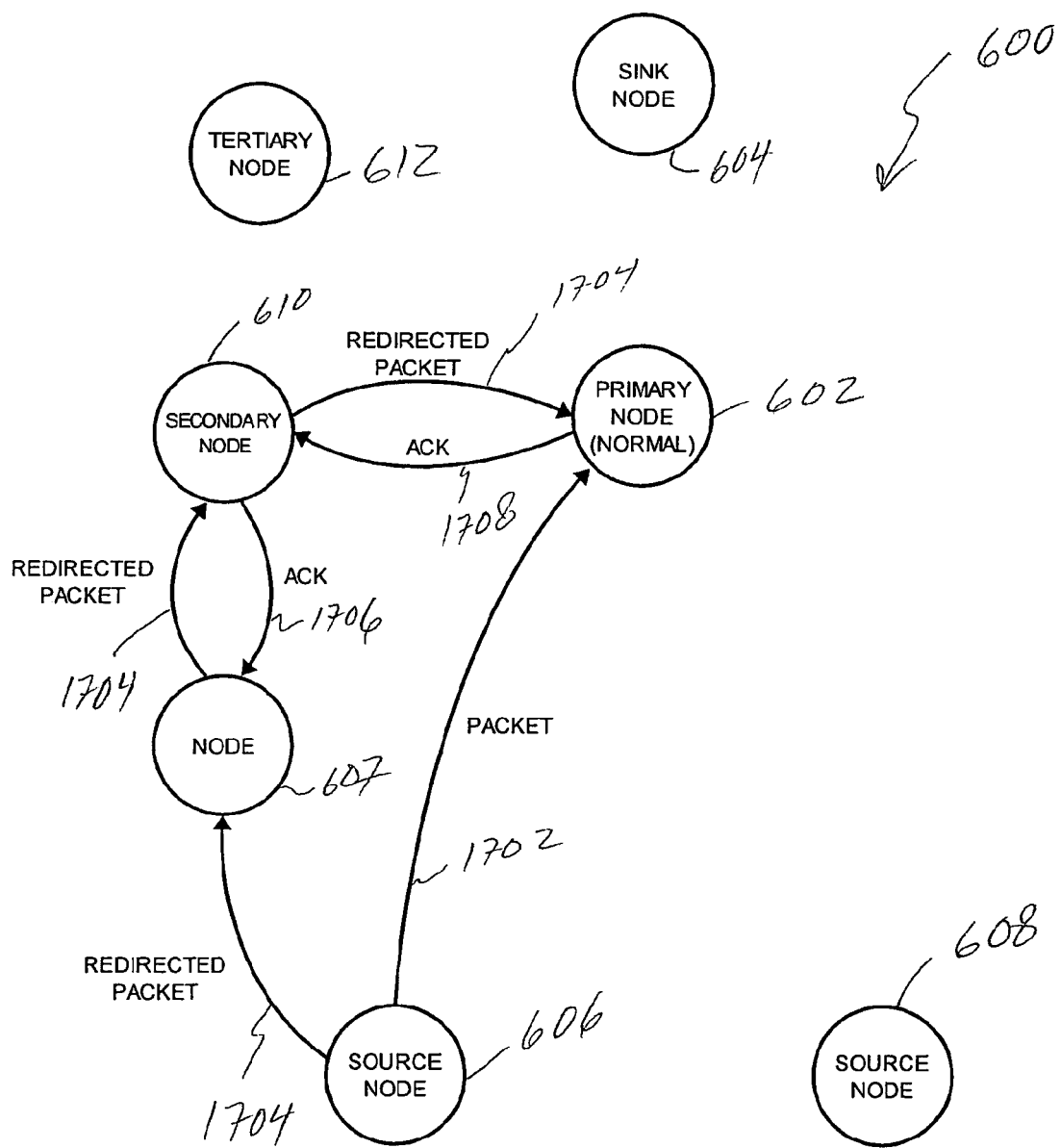

FIGS. 17A-17B are block diagrams illustrating one embodiment of redirection processing performed in the exemplary virtual site 600 of FIG. 6. FIG. 17A illustrates the redirection processing when the primary node 602 is in a normal state. FIG. 17B illustrates the redirection processing when the primary node 602 fails. In the example shown in FIGS. 17A-17B, the source nodes 606 and 608 are both one-hop neighbors of the primary node 602 but are not one-hop neighbors of the secondary node 610 or the tertiary node 612. Intermediate node 607 is a one-hop neighbor of the source nodes 606 and 608 and the secondary node 610 such that packets sent between the secondary node 610 and the source node 606 or 608 can be routed through the intermediate node 607.

In this example, when a data packet is transmitted from the source node 606 to the primary node 602 for the second subscription (S2), the source node 606 expects to receive an acknowledgment for the transmitted data packet. The primary node 602 transmits an acknowledgment to the source node 606 if the primary node 602 successfully receives the data packet. If the network routing layer 114 of the source node 606 does not receive an acknowledgment for that packet within a predetermined amount of time, the network routing layer 114 of the source node 606 informs the availability module 116 in the node 606 of that fact. The availability module 116 in the source node 606 uses the subscription identifier of the transmitted data packet to identify which virtual site node list is associated with that packet. Then the availability module 116 selects the "next" node in that virtual site node list. When the packet is currently addressed to the primary node 602, the next node is the secondary node 610. When the packet is currently addressed to the secondary node 610, the next node is the tertiary node 612. When the packet is currently addressed to the tertiary node 612, the packet cannot be redirected. In this example, the packet is addressed to the primary node 602, so the availability module 116 selects, as the next node, the address of the secondary node 610 from the virtual site node list for the virtual site 600. The availability module 116 of the source node 606 returns the address of the secondary node 610 (that is, the next node) to the network routing layer 114 of the source node 606, which replaces the original destination address of the packet with the address of the secondary node 610. Then, the network routing layer 114 of the source node 606 transmits the modified packet (referred to here as the "redirected packet" 1704) to the secondary node 610 via the intermediate node 607. The intermediate node 607 receives the redirected packet and transmits it to the secondary node 610. The intermediate node 607 awaits an acknowledgment from the secondary node 610 confirming that the secondary node 610 successfully received the redirected packet. If no such acknowledgment is received within the predetermined time period, the intermediate node 607 selects the next node in the virtual site node list (that is, the tertiary node 612) and addresses and transmits the packet to the next node in the manner described here.

When such a redirected packet is received at the network routing layer 114 of the secondary node 610, the network routing layer 114 transmits to the intermediate node 607 an acknowledgment 1706 for the received redirected packet because both of the conditions for transmitting an acknowledgment will be true (that is, the virtual site bit in the packet's header is set and the destination address of the packet corresponds to the secondary node 610 which is contained in the virtual site node list for the virtual site 600). The network routing layer 114 of the secondary node 610 passes the redirected packet to the data management stack 112 on the secondary node 610. The data management stack 112 identifies the packet as a redirected packet based on the subscriber identifier since the data management stack 112 is aware of the subscriptions for which the secondary node 610 serves as a secondary node. The data management stack 112 notifies the availability module 116 of the secondary node 610 of the fact that the secondary node 610 has received the redirected packet 1704 for the subscription identified in that redirected packet 1704. The availability module 116 determines which node the redirected packet was originally intended for using the address of the secondary node 610, the subscription identifier in the redirected packet and the virtual site node list for the virtual site 600 maintained by the availability module 116. In this example, the availability module 116 of the secondary node 610 determines that the redirected packet was originally intended for the primary node 602 of the virtual site 600. In the particular embodiment shown in FIGS. 17A-17B, the availability module 116 of the secondary node 610 then queries the network routing layer 114 of the secondary node 610 to determine if the originally intended node for the redirected packet (the primary node 602 in this example) has failed. The network routing layer 114 uses the underlying routing protocol used in the wireless sensor network 100 to determine if the originally intended node has failed.

The additional check to determine if the originally intended node for the redirected packet has in fact failed is performed in this embodiment in order to increase robustness in the wireless network. Such approach is especially advantageous where there is a high incidence "false alarms" indicating that a node has failed. Performing the additional check can detect some false alarms, which avoids unnecessarily performing the fail over processing. In some other embodiments, such an additional check is not performed (for example, where the underlying routing protocol does not have the ability to determine if a particular node has failed). In such an embodiment, the last-hop acknowledgement scheme described here provides a means by which a transmitting node can determine that a destination node has failed.

In the example shown in FIG. 17A, the network routing layer 114 indicates that the originally intended node for the redirected packet has not failed. The availability module 116 of the secondary node 610 informs the data management stack 112 of that fact, which causes the data management stack 112 to forward the redirected packet 1704 onto the originally intended node (the primary node 602 in this example), which sends an acknowledgment 1708 to the secondary node 610 if the primary node 602 successfully receives the redirected packet 1704.

In the example shown in FIG. 17B, the network routing layer 114 indicates that the originally intended node for the redirected packet has failed. The availability module 116 of the secondary node 610 informs the data management stack 112 of that fact, which causes the data management stack 112 to perform the primary-node processing for the set of subscriptions (S1, S2, and S3) in place of the originally intended node (the primary node 602 in this example). The data management stack 112 of the secondary node 610 will have access to replicated data for the set of subscriptions (S1, S2, and S3) and the redirected packet 1704, which should permit the data management stack 112 of the secondary node 612 to perform such primary-node processing with reduced data loss. The availability module 116 of the secondary node 610 informs (1720, 1722) the availability modules 116 of any source nodes included in the set of subscriptions (S1, S2, and S3) for which the primary node 602 acted as a sink entity (that is, source nodes 606 and 608 in this example). In the particular example shown in FIG. 17B, the packets transmitted to the source nodes 606 and 608 are routed via intermediate node 607.

The availability modules 116 at each of the source nodes 606 and 608 cause the data management stack 112 in that source node to redirect all future publications for the second and third subscriptions (S2 and S3), respectively, to the secondary node 610 (thereby avoiding the need to redirect subsequent packets). As a result, the neighbor redirection processing described here will typically only be performed for a finite amount of time between the failure of the primary node 602 and when the source nodes learn of the secondary node 610 taking over for the primary node 602.

In addition, as a part of the primary-node processing performed by the secondary node 610 for the set of subscriptions (S1, S2, and S3), the secondary node 610 publishes events to the sink node 604 for subscription S1 when appropriate.

Also, the availability module 116 of the secondary node 610 replicates all data received and transmitted by the secondary node 610 for the set of subscriptions (S1, S2, and S3) to the tertiary node 612. In the event that the secondary node 610 fails to send an acknowledgment to one of the source nodes 606 and 608 for a packet transmitted by the source node for the second or third subscription (S2 and S3), respectively, similar processing is performed to redirect the packet to the tertiary node 612 and have the tertiary node 612 process the redirected packet and perform the primary-node processing for the set of subscriptions (S1, S2, and S3) in the event that the secondary node 610 has failed. In the event that the secondary node 610 has failed, the tertiary node 612 does not replicate any data since there would be no remaining backup nodes to replicate data to and, in the event that the tertiary node 612 fails while it is performing the primary-node processing for the virtual site 600, the virtual site 600 fails. Optionally, before the tertiary node 612 performs such fail over processing, the tertiary node 612 checks if the primary node 602 and the secondary node 610 have actually failed (for example, by having network routing layer 114 of the tertiary node 612 uses the underlying routing protocol used in the wireless sensor network 100 to determine if the nodes 602 and 610 have failed).

Moreover, it may be the case that respective virtual sites have been established at the source nodes 606 and 608, in which case last-hop acknowledgement and redirection within such virtual sites (if necessary) are used for any packets transmitted to the source nodes 606 and 608.

A virtual site (and the related fail-over processing and last-hop acknowledgement with redirection scheme) described here can also be used to improve the fault tolerance of a node that performs critical or important processing for the routing protocol used in a wireless network. For example, in one embodiment implemented using the network 100 of FIG. 1, the underlying routing protocol used in the wireless network 100 makes use of clusters 130. As noted above, each cluster 130 has a cluster head node 132 that tracks which nodes are members of that cluster 130 and that forwards inter-cluster packets to appropriate nodes. This processing (referred to here as "cluster-head" processing) is performed by each cluster head 132. In one embodiment, a virtual site is established at each cluster head 132.

Figure 18:
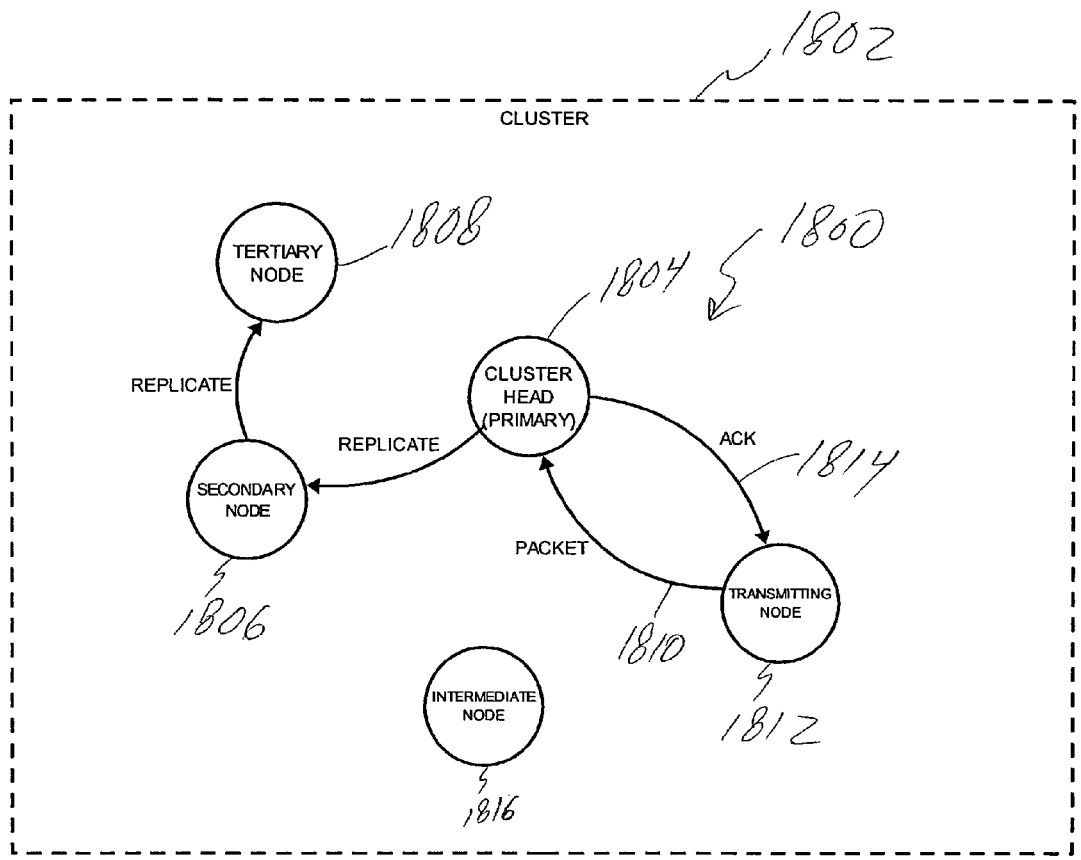
FIG. 18 is a block diagram that illustrates one example of a virtual site established at a cluster head node.

FIG. 18 is a block diagram that illustrates one example of a virtual site 1800 established at a cluster head node. In the example shown in FIG. 18, a cluster 1802 of nodes is a part of a wireless sensor network (for example, the wireless sensor network 100 of FIG. 1). The routing protocol used in the wireless sensor network selects a cluster head node 1804 from the nodes included in the cluster 1802. In this example, a virtual site 1800 is formed at the cluster head node 1804 in order to improve the robustness and fault tolerance of the cluster head node 1802.

The cluster head node 1804, when able to do so, performs the cluster-head processing for the cluster 1802. The cluster head node 1804, in the context of the virtual site 1800, is also referred to here as the primary node 1804. The virtual site 1800 includes one or more backup nodes. That is, the virtual site 1800 comprises a set of redundant neighbor nodes that includes the primary node 1804 and the one or more backup nodes. In the example shown in FIG. 18, the virtual site 1800 includes two backup nodes—a secondary node 1806 and a tertiary node 1808. In this example, each of the backup nodes (that is, nodes 1806 and 1808) is one hop away from the primary node 1804. Data that is sent and received by the primary node 1804 in its capacity as the cluster head for the cluster 1802 is replicated at the secondary node 1806 and tertiary node 1808. When the primary node 1804 is unable to perform the cluster-head processing for the cluster 1802, a fail over process is initiated in which one of the backup nodes is selected to perform the cluster-head processing for the cluster 1802 in place of the primary node 1804. In this embodiment, when a fail over occurs and while one of the backup nodes performs the cluster-head processing for the cluster 1802, a new virtual site is formed at and for that backup node, where the backup node serves as the primary node for the new virtual site.

Each virtual site (including the virtual site 1800) is established, in one embodiment, using a registration process similar to the registration process described above in connection with FIGS. 8-13. In such an embodiment, each of the one-hop neighbors of the primary node 1804 and the secondary node 1806 are sent a virtual site node list that identifies the primary node 1804, the secondary node 1806, and the tertiary node 1808 for each virtual site.

FIG. 18 illustrates the operation of the virtual site 1800 when the primary node 1804 is performing the cluster-head processing for the cluster 1802. In the example shown in FIG. 18, the routing protocol implemented by the network routing layer 114 in each of the nodes of the wireless sensor network 100 makes use of a last-hop acknowledgment with neighbor redirection scheme similar to the one described above in connection with FIGS. 16-17B. In this example, when a packet 1810 is transmitted to the primary node 1804 from a one-hop neighbor node 1812 of the primary node 1804, the primary node 1804 transmits an acknowledgment 1814 to the one-hop neighbor node 1812 if the packet 1810 is successfully received by the primary node 1804. The acknowledgment 1814 is transmitted to confirm that the primary node 1804 successfully received the packet 1810. Also, in this embodiment, an acknowledgment 1814 is only sent to the one-hop neighbor node 1812 of the primary node 1802 and additional acknowledgements are not transmitted to other nodes (for example, to other nodes along a multi-hop transmission path).

Also, when the primary node 1804 receives the packet 1810 from the node 1812, the primary node 1804 replicates the received packet at the secondary node 1806. The secondary node 1806 receives the replicated packet and buffers it for use by the secondary node 1806 in the event that the primary node 1804 fails and the secondary node 1806 performs the cluster-head processing for the cluster 1802. The secondary node 1806, in this example, further replicates the received packet to the tertiary node 1808. The tertiary node 1808 buffers the replicated packet for use by the tertiary node 1808 in the event that the primary node 1804 and the secondary node 1806 fail and the tertiary node 1808 performs the cluster-head processing for the cluster 1802.

Figure 19:
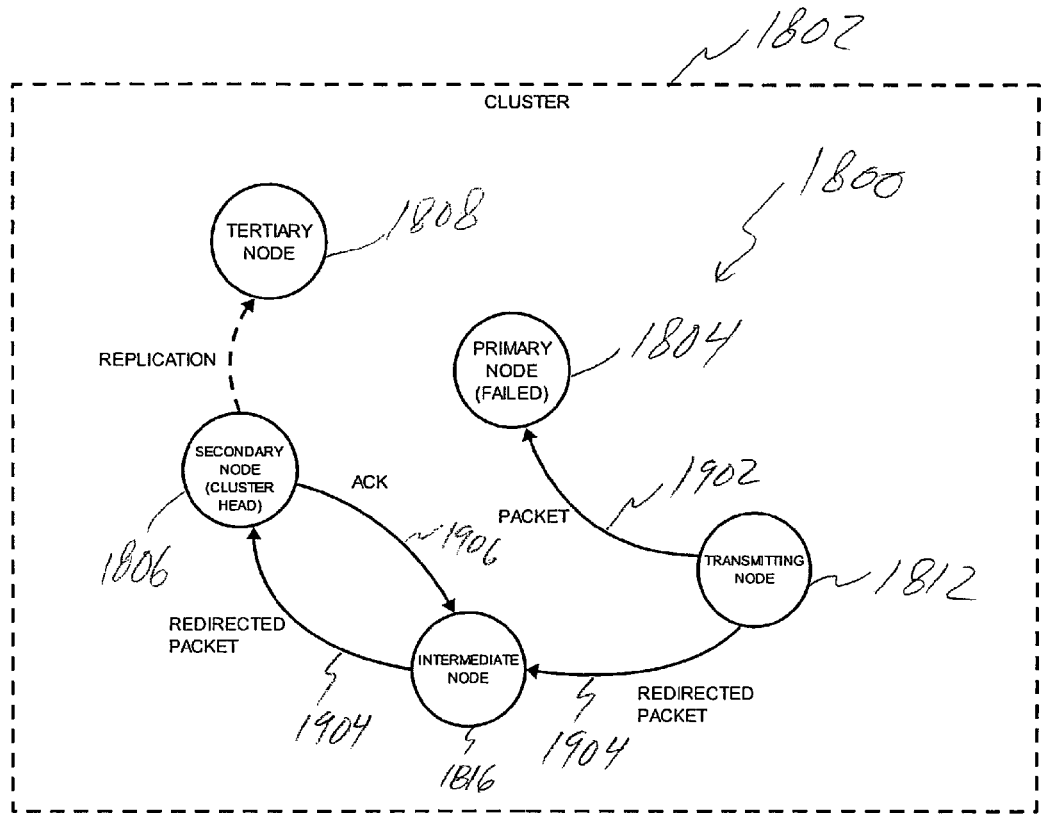
FIG. 19 is a block diagram illustrating one example of the operation of redirection processing in the exemplary virtual site of FIG. 18.

FIG. 19 is a block diagram illustrating one example of the operation of redirection processing in the exemplary virtual site 1800 of FIG. 18. In the example shown in FIG. 19, when a transmitting node 1812 attempts to transmit a packet 1902 to the primary node 1804 for the cluster 1802 and fails to receive an acknowledgement within a predetermined amount of time, the transmitting node 1812 selects the "next" node in the virtual site node list for the virtual site 1800. When the packet 1902 is currently addressed to the primary node 1804, the next node is the secondary node 1806. The transmitting node 1812 replaces the original destination address of the packet 1902 with the address of the secondary node 1806. Then, the transmitting node 1812 transmits the modified packet (referred to here as the "redirected packet" 1904) to the secondary node 1806 via an intermediate node 1816 included in the cluster 1800. The intermediate node 1816 receives the redirected packet 1904 and transmits it to the secondary node 1806. The intermediate node 1816 awaits an acknowledgment from the secondary node 1806 confirming that the secondary node 1806 successfully received the redirected packet 1904. If no such acknowledgment is received within the predetermined time period, the intermediate node 1818 selects the next node in the virtual site node list for the virtual site 1800 (that is, the tertiary node 1808) and addresses and transmits the modified packet to the next node in the manner described here.

When the redirected packet 1904 is received at the secondary node 1808, the secondary node 1808 transmits to the intermediate node 1818 an acknowledgment 1906 for the received redirected packet 1904. Also, the secondary node 1806 identifies the packet 1904 as a redirected packet for the virtual site 1800 and begins performing the cluster-head processing for the cluster 1802 and replicates any packets it receives in its capacity as the cluster head for the cluster 1800 to the tertiary node 1808. In this embodiment, the secondary node 1806 also establishes a new virtual site at the secondary node 1806 for the cluster 1802 that replaces the previous virtual site 1800.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A wireless network comprising:
    a plurality of nodes that communicate over wireless communication links;
    wherein a virtual site is established at a primary node included in the plurality of nodes;
    wherein a backup node is selected for the virtual site from the plurality of nodes;
    wherein when the primary node is able to do so, the primary node performs predetermined processing for the virtual site and replicates at the backup node data related to the processing; and
    wherein when the primary node is unable to perform the processing, the backup node performs the processing for the virtual site using at least some of the data replicated at the backup node;
    wherein at least one of the plurality of nodes receives sensor data from a sensor.

2. The wireless network of claim 1, wherein the processing comprises processing related to a set of subscriptions.

3. The wireless network of claim 2, wherein the primary node comprises:
    a data management stack that performs the processing for the set of subscriptions when the processing is performed by the primary node; and
    an availability module that replicates at the backup node the data related to the processing for the set of subscriptions.

4. The wireless network of claim 3, wherein the primary node further comprises a multiplexer agent that is in communication with the data management stack and the availability module.

5. The wireless network of claim 1, wherein the processing comprises processing related to a routing protocol.

6. The wireless network of claim 1, wherein the processing comprises processing for a cluster head node.

7. The wireless network of claim 1, wherein the backup node is a one-hop neighbor of the primary node.

8. The wireless network of claim 1,
    wherein a plurality of backup nodes are selected for the virtual site from the plurality of nodes;
    wherein at least one of the backup nodes is selected from the plurality of backup nodes to perform the processing when the primary node is unable to perform the processing.

9. The wireless network of claim 8,
    wherein the plurality of backup nodes comprises a secondary node and a tertiary node from the plurality of nodes;
    wherein the secondary node performs the processing when the primary node is unable to perform the processing; and wherein the tertiary node performs the processing when the primary node and the secondary node are unable to perform the processing.

10. A method for use in a wireless network comprising a plurality of nodes that communicate over wireless communication links, the method comprising:
   establishing a virtual site at a primary node included in the plurality of nodes;
   selecting a backup node for the virtual site from the plurality of nodes;
   receiving sensor data from a sensor;
   when the primary node is able to do so, at the primary node, performing predetermined processing for the virtual site; and replicating at the backup node data related to the processing; and
   when the primary node is unable to perform the processing, at the backup node, performing the processing for the virtual site using at least some of the data replicated at the backup node.

11. The method of claim 10, wherein the processing comprises processing related to a set of subscriptions.

12. The method of claim 10, wherein the processing comprises processing related to a routing protocol.

13. The method of claim 10, wherein the processing comprises processing for a cluster head node.

14. The method of claim 13, further comprising:
   transmitting data from a transmitting node to the primary node;
   when the primary node receives the transmitted data, transmitting an acknowledgment for the data to the transmitting node; and
   when a predetermined amount of time has elapsed since transmitting the data from the transmitting node to the primary node and the transmitting node has not received the acknowledgment, redirecting the data to the backup node; and
   wherein the backup performs the processing when the data is redirected to the backup node.

15. The method of claim 14, further comprising, when the data is redirected to the backup node, determining if the primary node has failed and, if the primary node has failed, the backup node performs the processing for the virtual site.

16. A wireless node comprising:
   a wireless transceiver to communicate over a wireless communication link; and
   a sensor interface to receive, at the wireless node, sensor data from a sensor;
   wherein the wireless node establishes a virtual site at the wireless node, the virtual site comprising the wireless sensor node and a backup wireless sensor node;
   wherein when the wireless node is in a normal state, the wireless node performs processing for the virtual site and replicates at the backup wireless node data related to processing; and
   wherein the backup wireless node performs the processing for the virtual site when the wireless node is in a failed state.

17. A wireless node, comprising:
   a wireless transceiver to communicate over a wireless communication link; and
   a programmable processor that executes software;
   wherein the wireless node acts as a backup node for a virtual site established for a primary wireless node, the virtual site comprising the primary wireless node and the wireless node;
   wherein when the primary wireless node is able to do so, the primary wireless node performs processing for the virtual site and the wireless node receives replicated data related to the processing for the virtual site from the primary wireless node; and
   wherein the wireless node performs the processing for the virtual site when the primary wireless node is unable to do so; and
   wherein the software executed by the programmable processor implements an availability module that receives the data replicated from the primary wireless node.

18. A wireless node, comprising:
   a wireless transceiver to communicate over a wireless communication link; and
   wherein a virtual site is established for a primary node, the virtual site comprising the primary node and a backup node;
   wherein when the primary node is able to do so, the primary node performs processing for the virtual site; and
   wherein when the wireless node transmits data to the primary node, the wireless node determines if an acknowledgment for the data is received from the primary node within a predetermined amount of time, and if the acknowledgment for the data is not received from the primary node within the predetermined amount of time, the wireless node redirects the data to the backup node.

19. An apparatus for use in a wireless network comprising a plurality of nodes that communicate over wireless communication links, the apparatus comprising:
   means for establishing a virtual site at a primary node included in the plurality of nodes;
   means for selecting a backup node for the virtual site from the plurality of nodes;
   means for receiving sensor data from a sensor;
   means for performing, when the primary node is able to do so, at the primary node, predetermined processing for the virtual site;
   means for replicating at the backup node data related to the processing; and
   means for, at the backup node, performing the processing for the virtual site using at least some of the data replicated at the backup node when the primary node is unable to perform the processing.

20. A program product comprising a plurality of program instructions embodied on a processor-readable medium, wherein the program instructions are operable to cause at least one programmable processor included in a wireless node to:
   participate in establishing a virtual site comprising a primary node and a backup node; and
   when the wireless node is selected as the primary node for the virtual site:
     perform predetermined primary node processing for the virtual site when able to do so; and
     replicate, to another node selected as the backup node for the virtual site, data used in the primary-node processing performed by the wireless node; and
   wherein the program instructions implement a data management stack that performs at least a portion of the predetermined primary node processing for the virtual site; and
   wherein the program instructions implement an availability module that replicates data used in the primary-node processing performed by the wireless node.

21. The program product of claim 20, wherein the program instructions are further operable to cause the at least one programmable processor to:
   when the wireless node is selected as the backup node for the virtual site:

receive date replicated from another node selected as the primary node for the virtual site; and perform the predetermined primary node processing for the virtual site using data replicated from the primary node when the primary node is unable to perform the primary node processing for the virtual site.

22. The program product of claim 20, wherein program instructions are operable to cause the at least one programmable processor receive sensor data from a sensor.

23. A program product comprising a plurality of program instructions embodied on a processor-readable medium, wherein the program instructions are operable to cause at least one programmable processor included in a wireless node to:

participate in establishing a virtual site comprising a primary node and a backup node; and when the wireless node is selected as the backup node for the virtual site:

receive data replicated from another node selected as the primary node for the virtual site; and perform predetermined primary node processing for the virtual site using the data replicated from the primary node when the primary node is unable to perform the primary node processing for the virtual site; and wherein the program instructions implement an availability module that receives the data replicated from the primary node.

24. The program product of claim 23, wherein the program instructions implement a data management stack that performs at least a portion of the predetermined primary node processing for the virtual site.

25. The program product of claim 23, wherein the program instructions are further operable to cause the at least one programmable processor to:

when the wireless node is selected as the primary node for the virtual site:

perform the predetermined primary node processing for the virtual site when able to do so; and replicate, to another node selected as the backup node for the virtual site, data used in the primary-node processing performed by the wireless node.

26. The program product of claim 23, wherein program instructions are operable to cause the at least one programmable processor receive sensor data from a sensor.

* * * * *